US007782377B2

(12) United States Patent
Miyanari et al.

(10) Patent No.: US 7,782,377 B2
(45) Date of Patent: Aug. 24, 2010

(54) IMAGE SENSING APPARATUS, CONTROL METHOD THEREFOR, STORAGE MEDIUM, AND PROGRAM TO CREATE CORRECTION DATA

(75) Inventors: Hiroshi Miyanari, Kanagawa (JP); Akira Egawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 925 days.

(21) Appl. No.: 10/786,864

(22) Filed: Feb. 24, 2004

(65) Prior Publication Data

US 2004/0165101 A1    Aug. 26, 2004

(30) Foreign Application Priority Data

Feb. 26, 2003   (JP)   ............................. 2003-049698
Jul. 31, 2003   (JP)   ............................. 2003-283973

(51) Int. Cl.
*H04N 5/217*   (2006.01)
(52) U.S. Cl. ...................... 348/241; 348/243; 348/246; 348/247
(58) Field of Classification Search ................. 348/246, 348/247, 243, 241, 248
See application file for complete search history.

(56) References Cited

U.S. PATENT DOCUMENTS 5,335,008 A * 8/1994 Hamasaki .................... 348/301
5,416,516 A * 5/1995 Kameyama et al. ......... 348/246
5,805,216 A * 9/1998 Tabei et al. .................. 348/246
6,529,622 B1 * 3/2003 Pourjavid .................... 382/149
6,642,960 B1 * 11/2003 Kohashi et al. ............. 348/246
6,707,955 B1 * 3/2004 Shiomi ........................ 382/312
6,710,808 B1 * 3/2004 Yamagishi .................. 348/362
6,819,358 B1 * 11/2004 Kagle et al. ................. 348/246
2002/0015111 A1* 2/2002 Harada ........................ 348/642
2002/0085667 A1* 7/2002 Miller .......................... 378/48
2002/0097446 A1* 7/2002 Lee ............................. 358/406

FOREIGN PATENT DOCUMENTS

JP    2001016509 A  *  1/2001
JP    2003-244513       8/2003
JP    2003-264736       9/2003
JP    2003-333434       11/2003

\* cited by examiner

*Primary Examiner*—Jason Chan
*Assistant Examiner*—Usman Khan
(74) *Attorney, Agent, or Firm*—Cowan, Liebowitz & Latman, P.C.

(57) ABSTRACT

It is an object to provide an image sensing apparatus which can shorten the time required for the creation of correction data by reducing the amount of data used for the creation of correction data. In order to achieve the above object, an image sensing apparatus according to this invention includes a plurality of pixels, a first calculating unit which creates correction data by performing computation using signals which are acquired by image sensing in an unexposed state and smaller in number than said plurality of pixels, and a second calculating unit which corrects image data of the plurality of pixels, acquired by image sensing in an exposed state, by using the correction data.

2 Claims, 21 Drawing Sheets

F I G. 20
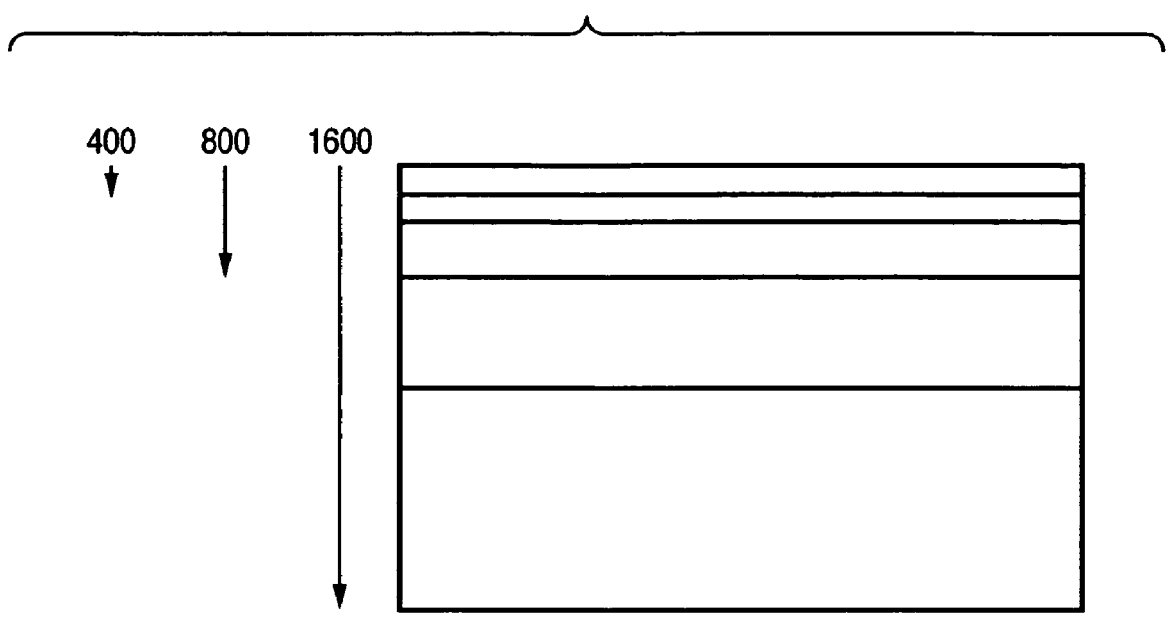

IMAGE SENSING APPARATUS, CONTROL METHOD THEREFOR, STORAGE MEDIUM, AND PROGRAM TO CREATE CORRECTION DATA

FIELD OF THE INVENTION

The present invention relates to an image sensing apparatus which senses still images and moving images.

BACKGROUND OF THE INVENTION

As an image sensing apparatus capable of sensing images and recording them on a recording medium, an electronic camera is generally known and has already been available on the market, which uses, as a recording medium, a memory card having a sold-state memory device, and can record/play back still images and moving images sensed by using a solid-state image sensing device such as a CCD or CMOS.

In general, when image sensing is performed by using a solid-state image sensing device such as a CCD or CMOS, a two-dimensional dark fixed pattern noise in the image data, obtained by the actual photographing operation while the image sensing device is in an exposed state, is corrected by using the correction value generated from the dark image data obtained by dark image photographing operation while the image sensing device is in an unexposed state. This makes it possible to suppress a deterioration in image quality due to two-dimensional fixed pattern noise such as pixel loss caused by dark current noise in the image sensing device and a fine flaw unique to the image sensing device.

The causes of a deterioration in image quality are not, however, limited to the above two-dimensional dark fixed pattern noise, and include one-dimensional dark fixed pattern noise (i.e., circuit-based noise), caused by voltage irregularity due to a resistive component in the power line in the sensor, device variations, and the like.

The above two-dimensional dark fixed pattern noise, in particular, is caused by the dark current generated when the electric charge storage time is long or the temperature of the image sensing device is high, and becomes a dominant factor for a deterioration in image quality. In contrast to this, one-dimensional dark fixed pattern noise becomes a dominant factor for a deterioration in image quality when the electric charge storage time is short or the temperature of the image sensing device is room temperature or lower. If correction data is created under the same conditions at the time of photographing operation in spite of the fact that the characteristics change depending on the settings in the image sensing apparatus, ambient temperature, and the like at the time of photographing operation, the time taken for the creation of the correction data becomes a release time lag or the like. This causes discomfort, and the user may miss a shutter chance.

SUMMARY OF THE INVENTION

The present invention has been made in consideration of the above problems, and has as its object to provide an image sensing apparatus which can shorten the time required for the creation of correction data by reducing the amount of data used for the creation of correction data.

In order to achieve the above object, an image sensing apparatus according to the present invention has the following arrangement.

That is, an image sensing apparatus comprising:
a plurality of pixels;
a first calculating portion which creates correction data by performing computation using signals which are acquired by image sensing in an unexposed state and smaller in number than the plurality of pixels; and
a second calculating portion which corrects image data of the plurality of pixels, acquired by image sensing in an exposed state, by using the correction data.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 20 is a view showing an example of the range of dark image data for each ISO sensitivity setting which is required to create one-dimensional dark fixed pattern noise correction data.

DETAILED DESCRIPTION OF THE PREFERRED EMBODIMENTS

Preferred embodiments of the present invention will now be described in detail in accordance with the accompanying drawings.

First Embodiment

An image sensing apparatus according to an embodiment of the present invention will be described below with reference to the accompanying drawings.

1. Schematic Arrangement of Image Sensing Apparatus

Figure 1:
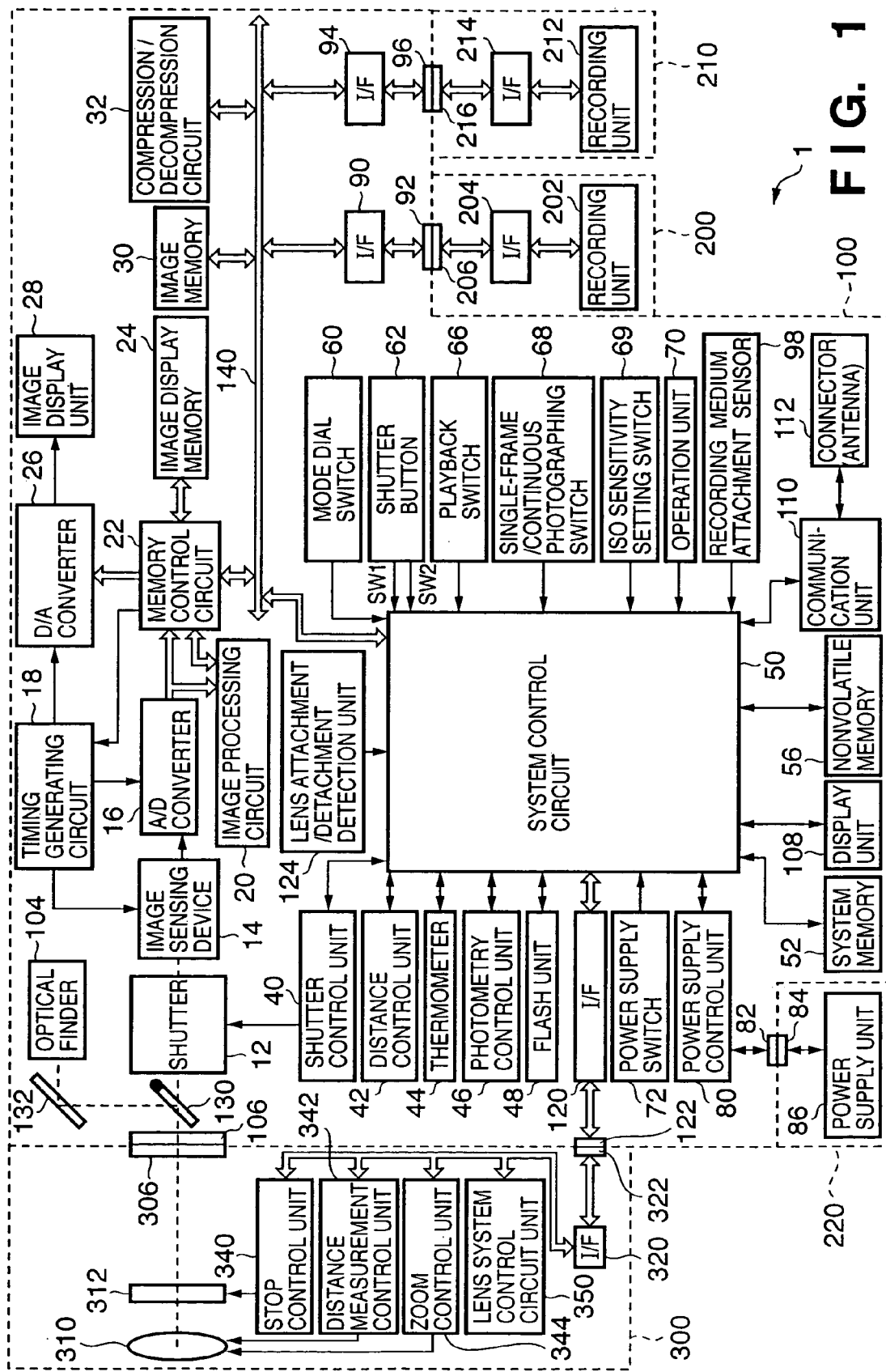
FIG. 1 is a block diagram showing the schematic arrangement of an image sensing apparatus common to the respective embodiments of the present invention.

FIG. 1 is a block diagram showing the schematic arrangement of an image sensing apparatus common to each embodiment of the present invention.

Referring to FIG. 1, an electronic camera 1 as an image sensing apparatus common to each embodiment of the present invention includes an image processing apparatus 100 connected to external memories 200 and 210 through connectors 92 and 96 and to an external power supply 220 through a connector 82, and a lens unit 300 connected to the image processing apparatus 100 through a lens mount 306 and connector 322.

The external power supply 220 includes a connector 84 connected to the connector 82 and a power supply unit 86. The power supply unit 86 is constituted by a primary battery such as an alkali battery or lithium battery, a secondary battery such as a NiCd battery, NiMH battery, or Li battery, an AC adaptor, or the like.

The image processing apparatus 100 is optically and electrically connected to the lens unit 300 through a lens mount 106 connected to the lens mount 306 and through a connector 122 connected to the connector 322. The image processing apparatus 100 includes a system control circuit 50 incorporating a known CPU for controlling the overall image processing apparatus 100 and the like.

Control signals, status signals., data signals, and the like are exchanged between the image processing apparatus 100 and the lens unit 300 through the connector 122. In addition, currents at various voltages are also supplied through the connector 122. The connector 122 may also be designed for optical communication, voice communication, and the like as well as telecommunication.

The system control circuit 50 is connected to a shutter control unit 40 which controls a shutter 12, a distance control unit 42 and photometry control unit 46 which perform processing autofocus (AF) processing, automatic exposure (AE) processing, flash light adjustment (EF) processing, and the like, a thermometer 44 which detects an ambient temperature in a photography environment, a flash unit 48 having a function of emitting auxiliary AF light and a flash light adjusting function, an I/F 120 which electrically connects the image processing apparatus 100 to the lens unit 300 through the connector 122, a power supply switch 72 which switches/sets the power-on mode and power-off mode of the image processing apparatus 100, a power supply control unit 80 which connects to the connector 82, a system memory 52 which stores flags, constants, variables, programs, and the like for the operation of the system control circuit 50, a display unit 108 having a liquid crystal display unit, speaker, and the like which display operation states, messages, and the like in character form, image form, voice form, and the like in accordance with the execution of programs in the system control circuit 50, an electrically erasable programmable nonvolatile memory 56 in which programs are stored, a communication unit 110 which communicates with the outside world through a connector (antenna) 112, an external memory attachment/detachment detection unit 98 which detects whether or not the external memories 200 and 210 are connected to the connectors 92 and 96, and a lens attachment/detachment detection unit 124 which detects whether or not the lens unit 300 is mounted on the lens mount 106 and/or the connector 122.

The system control circuit 50 includes a mode dial switch 60 which switches various modes, a shutter button 62 which transmits a signal SW1 to the system control circuit 50 when pressed halfway, and transmits a signal SW2 to the system control circuit 50 when pressed fully, a playback switch 66 which issues an instruction to start playback operation of reading out images sensed in a photographing mode from an image memory 30 or the external memories 200 and 210 and display them on an image display unit 28, a single-frame/continuous photographing switch 68 which switches the setting to either the single-frame photographing mode or the continuous photographing mode, an ISO sensitivity setting switch 69 which sets an ISO sensitivity, and an operation unit 70 constituted by various buttons, a touch panel, and the like.

The system control circuit 50 includes a mirror 130 which guides part of a light beam from the lens mount 106 to an optical finder 104 through a mirror 132, the shutter 12 having a stop function of controlling the exposure of light beam from the mirror 130, an image sensing device 14 which converts the light beam received through the shutter 12 into an electrical signal, an A/D converter 16 which converts the analog signal output from the image sensing device 14 into a digital signal and transmits it to an image display memory 24 or the image memory 30, the image display memory 24 in which image data for display is written through a memory control circuit 22, a D/A converter 26 which converts the image data for display, which is written in the image display memory 24, from a digital signal to an analog signal, and transmits it to the image display unit 28, a timing generating circuit 18 which supplies clock signals and control signals to the image sensing device 14, A/D converter 16, and D/A converter 26, and the image display unit 28. The timing generating circuit 18 is controlled by the memory control circuit 22 and system control circuit 50.

The mirrors 130 and 132 guide the light beam incident on the lens unit 300 to the optical finder 104 by a single-lens reflex system. The mirror 132 may have either a quick-return mirror arrangement or a half mirror arrangement.

The memory control circuit 22 is directly connected to the A/D converter 16, the timing generating circuit 18, an image processing circuit 20, the image display memory 24, and the D/A converter 26. The memory control circuit 22 is also connected to the image memory 30 and a compression/decompression circuit 32 through a bus 140, and is connected to I/Fs 90 and 94 which are interfaces (I/Fs) with the external memories 200 and 210 through the bus 140 and the like. With this arrangement, the memory control circuit 22 controls these constituent elements.

The shutter control unit 40 controls the shutter 12 in cooperation with a stop control unit 340 which controls a stop 312 on the basis of photometry information from the photometry control unit 46.

The distance control unit 42 performs AF processing, and measures the in-focus state of an image formed as an optical image by causing the light beam incident on the lens unit 300 to be incident by the single-lens reflex system through the stop 312, the lens mounts 306 and 106, the mirror 130, and a sub-mirror for distance measurement (not shown).

The thermometer 44 detects an ambient temperature in a photography environment. In order to more accurately predict a dark current in the image sensing device 14 by using the thermometer 44, the thermometer 44 is preferably incorporated in the image sensing device 14.

The photometry control unit 46 performs AE processing, and measures the exposure state of an image formed as an optical image by causing the light beam incident on the lens unit 300 to be incident by the single-lens reflex system through the stop 312, the lens mounts 306 and 106, the mirror 130, and a photometry sub-mirror (not shown). The photometry control unit 46 also has an EF processing function in cooperation with the flash unit 48. The flash unit 48 has a function of emitting auxiliary AF light and a flash light adjusting function.

The image processing apparatus 100 is electrically connected to the lens unit 300 through the I/F 120.

The power supply switch 72 can switch/set the power-on and power-off modes of the image processing apparatus 100. The power supply switch 72 can also switch/set the power-on and power-off modes of various kinds of attachments such as the lens unit 300, external flash unit, and external memories 200 and 210 connected to the image processing apparatus 100.

The power supply control unit 80 is constituted by a battery detection circuit, a DC-DC converter, a switch circuit which switches blocks to be energized, and the like. The power supply control unit 80 detects the attachment/detachment of the power supply unit 86, the type of secondary battery mounted in the power supply unit 86, and the remaining capacity of the secondary battery, and controls the DC-DC converter on the basis of the detection result and an instruction from the system control circuit 50, thereby applying a necessary voltage to each unit including a recording medium for a necessary period of time.

The system memory 52 is a memory which stores constants, variables, programs, and the like for the operation of the system control circuit 50.

The display unit 108 is formed from a combination of an LCD, an LED, a sound producing device, and the like, and placed at one or a plurality of positions near the operation unit of the image processing apparatus 100 at which easy visual recognition is provided. Some functions of the display unit 108 are provided in the optical finder 104.

Of the display contents on the display unit 108, the contents to be displayed on the LCD or the like include single-frame/continuous photographing indication, self-timer indication, compression ratio indication, pixel resolution indication, recorded frame count indication, remaining frame count indication, shutter speed indication, aperture indication, exposure correction indication, flash indication, red-eye reduction indication, macro photographing indication, buzzer setting indication, timepiece battery remaining capacity indication, battery remaining capacity indication, error indication, information indication in number consisting of a plurality of digits, attachment/detachment state indication of the external memories 200 and 210, attachment/detachment state indication of the lens unit 300, communication I/F operation indication, date/time indication, indication representing a connection state with an external computer, and the like.

Of the display contents on the display unit 108, the contents to be displayed in the optical finder 104 include in-focus indication, photographing preparation completion indication, camera shake warning indication, flash charging indication, flash ready indication, shutter speed indication, aperture indication, exposure correction indication, recording medium write operation indication, and the like.

Of the display contents on the display unit 108, the contents to be displayed on the LED or the like include in-focus indication, photographing preparation completion indication, camera shake warning indication, flash-charging indication, flash ready indication, recording medium write operation indication, macro photographing setting notification indication, secondary battery charging indication, and the like.

Of the display contents on the display unit 108, the contents to be displayed by lamps and the like include, for example, information indicated by a self-timer notification lamp. The light emitted by this self-timer notification lamp may also used as auxiliary AF light.

The nonvolatile memory 56 is formed from an EEPROM or the like, and stores various kinds of parameters, set values such as an ISO sensitivity, and set modes.

The communication unit 110 has an RS232C interface, a USB interface, an IEEE1394 interface, a P1284 interface, an SCSI interface, a modem, a LAN, and various kinds of communication functions such as a radio communication function. The connector (antenna) 112 connects the image processing apparatus 100 to another equipment through the communication unit 110 or performs radio communication.

The external memory attachment/detachment detection unit 98 detects whether or not the external memories 200 and 210 are attached to the connectors 92 and 96. Although this embodiment includes two systems of interfaces and connectors for the attachment of recording media, interfaces and connectors for the attachment of recording media may be prepared in number corresponding to a single or an arbitrary number of systems.

Using I/Fs and connectors which comply with the specifications of PCMCIA cards, CF (Compact Flash (registered trademark)) cards, and the like as the I/Fs 90 and 94 and connectors 92 and 96 makes it possible to exchange image data and management information attached to the image data with another computer or peripheral equipment such as a printer by connecting various kinds of communication cards such as a LAN card, modem card, USB card, IEEE1394 card, P1284 card, SCSI card, and PHS card.

The mode dial switch 60 can switch/set various kinds of functional photographing modes such as an automatic photographing mode, programmed photographing mode, shutter priority photographing mode, aperture priority photographing mode, manual photographing mode, focal depth priority (depth) photographing mode, portrait photographing mode, landscape photographing mode, close-up photographing mode, sports photographing mode, night scene photographing mode, and panorama photographing mode.

When pressed halfway, the shutter button 62 turns on a shutter switch SW1 to instruct the system control circuit 50 to start AF (AutoFocus) processing, AE (Automatic Exposure) processing, AWB (Automatic White Balance) processing, EF (flash light adjustment) processing, and the like. When pressed fully, the shutter button 62 turns on a shutter switch SW2 to instruct the system control circuit 50 to start a series of operations including exposure processing of writing the signals read from the image sensing device 14, as image data, in the image memory 30 through the A/D converter 16 and memory control circuit 22, developing processing based on computation in the image processing circuit 20 or memory control circuit 22, and recording processing of reading but image data from the image memory 30, compressing the data in the compression/decompression circuit 32, and writing the image data in the external memories 200 and 210.

The playback switch 66 issues an instruction to start reading out the image photographed in a photographing mode from the image memory 30 or external memories 200 and 210 and displaying it on the image display unit 28.

The single-frame/continuous photographing switch 68 sets one of the following modes: the single-frame photographing mode in which when the shutter switch SW2 is pressed, one frame is photographed, and the camera is set in the standby state; and the continuous photographing mode in which photographing is continuously performed while the shutter switch SW2 is pressed.

The ISO sensitivity setting switch 69 sets an ISO sensitivity by changing the gain setting in the image sensing device 14 or image processing circuit 20.

The operation unit 70 is constituted by various kinds of buttons, a touch panel, and the like, which include a menu button, a set button, a macro button, a multi-window playback new page button, a flash setting button, a single-frame/continuous photographing/self-timer switching button, a menu move + (plus) button, a menu move − (minus) button, a playback image move +(plus) button, a playback image move − (minus) button, a photography image quality selection button, an exposure correction button, a date/time setting button, a selection/switching button which switches/sets photographing modes such as the panorama mode and various kinds of functions in the execution of playback operation, a determination/execution button which makes settings for the determination and execution of photographing modes such as the panorama mode and various kinds of functions in the execution of playback operation, an image display ON/OFF switch which turns on/off the image display unit 28, a quick review ON/OFF switch which sets a quick review function of automatically playing back photographed image data immediately after the photography, a compression mode switch which is a switch for selecting a compression ratio in JPEG compression or a CCDRAW mode of directly digitizing a signal from the image sensing device and recording it on a recording medium, the playback switch 66 which can set various kinds of modes such as a playback mode, multi-window playback/erase mode, and a PC connection mode, an AF mode setting switch which can set a one-shot AF mode in which autofocus operation is started when the shutter switch SW1 is pressed, and an in-focus state is maintained once the in-focus state is reached, and a servo-AF mode in which autofocus operation is continued while the shutter switch SW1 is pressed, and the like.

Adding a rotating dial switch allows the functions of the above plus and minus buttons to more smoothly select numerical values and functions.

Note that the mode dial switch 60, shutter button 62, playback switch 66, ISO sensitivity setting switch 69, and operation unit 70 may be constituted by one or a plurality of combinations of switches, dials, touch panels, pointing based on line-of-sight detection, voice recognition devices, and the like.

A light beam incident from the lens unit 300 is guided to the optical finder 104 by the single-lens reflex system through the lens mount 106 and the lenses 130 and 132. The optical finder 104 forms this light beam as an optical image and displays it. This makes it possible to perform photographing operation using only the optical finder 104 without using the electronic finder function implemented by the image display unit 28. Some functions of the display unit 108 are provided in the optical finder 104 to display, for example, in-focus indication, camera shake warning indication, flash charging indication, shutter speed indication, aperture indication, and exposure correction indication.

The A/D converter 16 converts the analog signal output from the image sensing device 14 into a digital signal. The converted signal is written in the image display memory 24 or image memory 30 through the image processing circuit 20 and memory control circuit 22 or directly.

The timing generating circuit 18 supplies clocks signals and control signals to the image sensing device 14, A/D converter 16, and D/A converter 26. More specifically, when a control signal is transmitted from the timing generating circuit 18 to the image sensing device 14, the image sensing device 14 transmits an electrical signal having undergone photoelectric conversion to the A/D converter 16. When a control signal from the timing generating circuit 18 is transmitted to the A/D converter 16 which is controlled by the memory control circuit 22 and system control circuit 50, the A/D converter 16 transmits a digital signal to the image processing circuit 20 or memory control circuit 22. When a control signal is transmitted from the timing generating circuit 18 to the D/A converter 26, the D/A converter 26 converts a signal from the memory control circuit 22 into an analog signal and transmits it to the image display unit 28.

The image processing circuit 20 performs predetermined pixel interpolation processing and color conversion processing for data from the A/D converter 16 or data from the memory control circuit 22. The image processing circuit 20 performs predetermined computation processing by using sensed image data as needed. The system control circuit 50 performs TTL (Though-The-Lens) AF processing, AE processing, and EF processing on the basis of the obtained computation result to control the shutter control unit 40 and distance control unit 42. The image processing circuit 20 also performs predetermined computation processing by using sensed image data, and performs TTL AWB (Automatic White Balance) processing on the basis of the obtained computation result.

Since this embodiment includes the distance control unit 42 and photometry control unit 46 as dedicated units, the system control circuit 50 may be designed to perform AF processing, AE processing, and EF processing by using the distance control unit 42 and photometry control unit 46 instead of performing AF processing, AE processing, and EF processing by using the image processing circuit 20. Alternatively, the system control circuit 50 may be designed to perform AF processing, AE processing, and EF processing by using the distance control unit 42 and photometry control unit 46 and also perform AF processing, AE processing, and EF processing by using the image processing circuit 20. More specifically, the system control circuit 50 may perform AF processing by using the measurement result obtained by the distance control unit 42 and the computation result obtained by causing the image processing circuit 20 to perform computation for the image data sensed by the image sensing device 14. In addition, the system control circuit 50 may perform exposure control by using the measurement result obtained by the photometry control unit 46 and the computation result obtained by causing the image processing circuit 20 to perform computation for the image data sensed by the image sensing device 14.

The memory control circuit 22 controls the A/D converter 16, timing generating circuit 18, image processing circuit 20, image display memory 24, D/A converter 26, image memory 30, and compression/decompression circuit 32.

The image display unit 28 is formed from a TFT LCD, and displays image data for display, which is written in the image display memory 24, through the D/A converter 26. The image display unit 28 can sequentially display sensed image data, and hence can implement an electronic finder function.

The image display unit 28 may have an image display switch which switches ON/OFF settings. This allows the image display unit 28 to perform various kinds of display operations described above only when the image display switch setting is ON, thus greatly reducing the power consumption of the image processing apparatus 100.

The image memory 30 is a memory for storing photographed still images and moving images, and has a storage capacity large enough to store a predetermined number of still images and moving images corresponding to a predetermined period of time. Therefore, in the continuous photographing mode of continuously photographing a plurality of still images or the panorama photographing mode, large-volume image data can be written in the image memory 30 at high speed. The image memory 30 can also be used as a work area for the system control circuit 50.

The compression/decompression circuit 32 compresses/decompresses image data by adaptive discrete cosine transform (ADCT) or the like. The compression/decompression circuit 32 reads an image stored in the image memory 30, performs compression processing or decompression processing, and writes the resultant data in the image memory 30.

The-external memories 200 and 210 are recording media such as a memory card and hard disk. The external memories 200 and 210 respectively recording units 202 and 212 each formed from a semiconductor memory, magnetic disk, or the like, I/Fs 204 and 214 as interfaces with the image processing apparatus 100, and connectors 206 and 216 for connection to the image processing apparatus 100.

The lens unit 300 is of an interchangeable lens type, and includes a photographing lens 310 which forms a light beam incident at the time of photography into an optical image on the image sensing device 14, the stop 312 which adjusts the amount of light beam from the photographing lens 310, the lens mount 306 which is mechanically coupled to the image processing apparatus 100, the connector 322 which is electrically connected to the image processing apparatus 100 through the connector 122, and an I/F 320 which is connected to the connector 322, the stop control unit 340, a distance measurement control unit 342, a zoom control unit 344, and a lens system control circuit unit 350.

The lens mount 306 mechanically couples the lens unit 300 to the image processing apparatus 100. The lens mount 306 incorporates various kinds of functions of electrically connecting the lens unit 300 to the image processing apparatus 100.

The connector 322 has a function of exchanging control signals, status signals, data signals, and the like between the image processing apparatus 100 and the lens unit 300, and receiving or supplying various kinds of currents. The connector 322 may be designed to transfer optical signals, audio signals, and the like as well as electrical signals.

The stop control unit 340 controls the stop 312 on the basis of the photometry information received from the photometry control unit 46 through the I/F 320 in cooperation with the shutter control unit 40 which controls the shutter 12.

The distance measurement control unit 342 controls the focusing of the photographing lens 310. The zoom control unit 344 controls the zooming of the photographing lens 310.

The lens system control circuit unit 350 controls the overall lens unit 300, and also includes the function of a memory storing constants, variables, programs, and the like for operation or the function of a nonvolatile memory holding identification information such as a number unique to the lens unit 300, management information, a full aperture value or minimum aperture value, function information such as a focal length, current and past set values, and the like.

2. Outline of One-Dimensional Dark Fixed Pattern Noise and Correction Processing Factors that cause one-dimensional dark fixed pattern noise will be described next.

Figure 2:
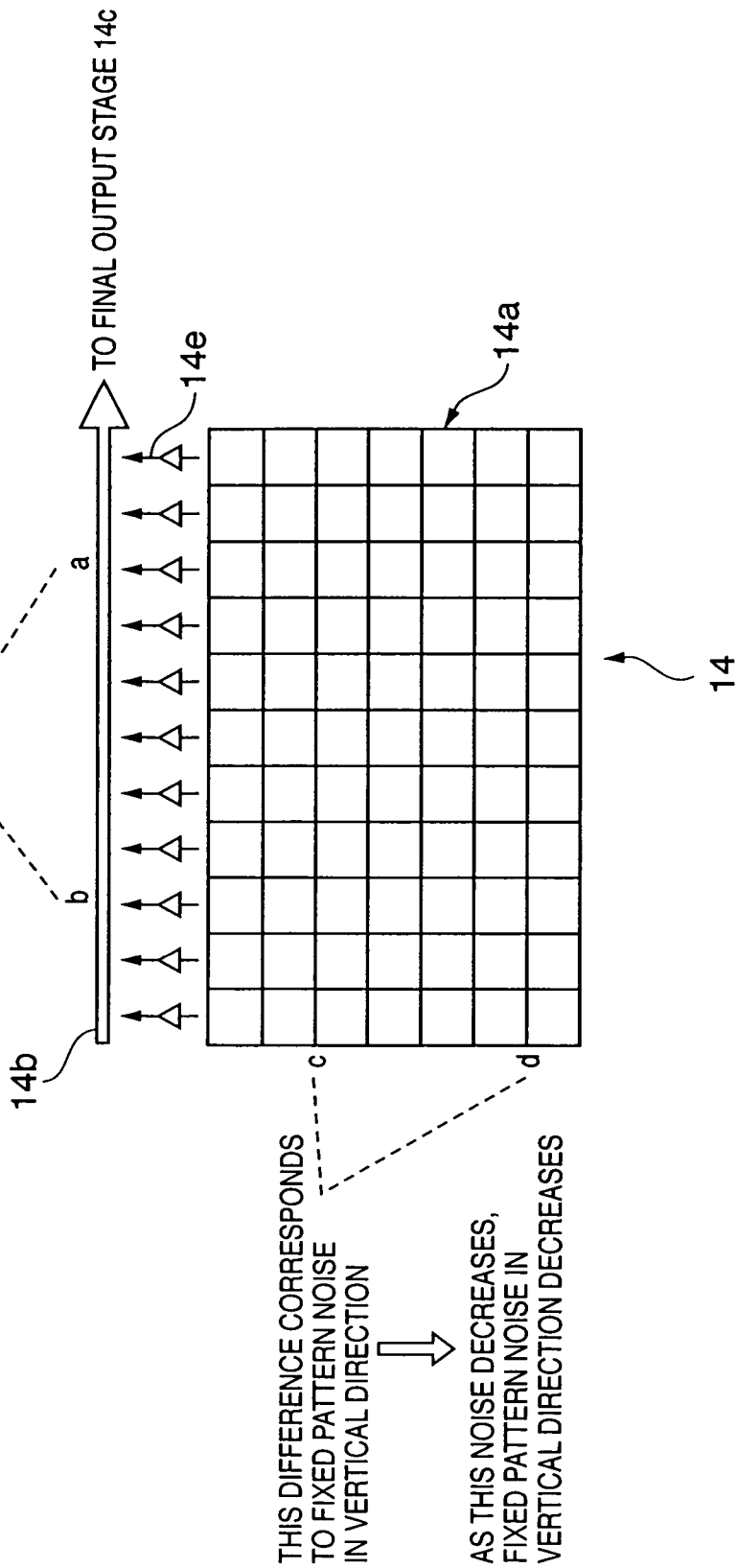
FIG. 2 is a view showing how one-dimensional dark fixed pattern noise is mixed in the horizontal and vertical directions in an image sensing device 14 in FIG. 1.

FIG. 2 is a view showing how one-dimensional dark fixed pattern noise is mixed in the horizontal and vertical directions of the image sensing device 14 in FIG. 1.

As shown in FIG. 2, the image sensing device 14 having a plurality of pixels two-dimensionally arranged in the horizontal and-vertical directions includes a pixel portion 14a which converts a received light beam into an electrical signal, and a common reading circuit 14b which is placed parallel to the pixel portion 14a and transmits the electrical signal received from the pixel portion 14a to a final output stage 14c. An amplifier 14e is provided for each array of pixels in the vertical direction between the common reading circuit 14b and the pixel portion 14a. Signals from the pixels are amplified by this amplifier and read by the common reading circuit 14b.

One-dimensional dark fixed pattern noise is produced by differences (variations) between read paths, as a main factor, which are caused when a light beam which is converted into an electrical signal by the pixel portion 14a of the image sensing device 14 and output reaches the final output stage 14c.

Fixed pattern noise in the horizontal direction depends on the difference between the read path represented by a vertical line a and the read path represented by a vertical line b in FIG. 2, whereas fixed pattern noise in the vertical direction depends on the difference between the read path represented by a horizontal line c and the read path represented by a horizontal line d in FIG. 2.

As in the image sensing device 14 shown in FIG. 2, therefore, if the horizontal lines of each pixel portion 14a share the common reading circuit 14b, and a circuit layout or the like is designed to reduce fixed pattern noise in the vertical direction which is mixed in when a signal on each horizontal line is transferred to the common reading circuit, the fixed pattern noise in the vertical direction is reduced to eliminate the need to correct it. In an image sensing apparatus using the image sensing device 14, by correcting actually photographed image data using only one-dimensional dark fixed pattern noise correction data in the horizontal direction, one-dimensional dark fixed pattern noise can be removed. Obviously, this operation may be applied to the vertical direction instead of the horizontal direction.

Fixed pattern noise due to the differences between the characteristics of the amplifiers provided for the respective arrays can be corrected by one-dimensional dark fixed pattern noise correction data in the horizontal direction. This greatly contributes to an improvement in image quality.

An outline of correction processing for actually photographed image data by using one-dimensional dark fixed pattern noise correction data will be described next with reference to FIG. 6.

Figure 6:
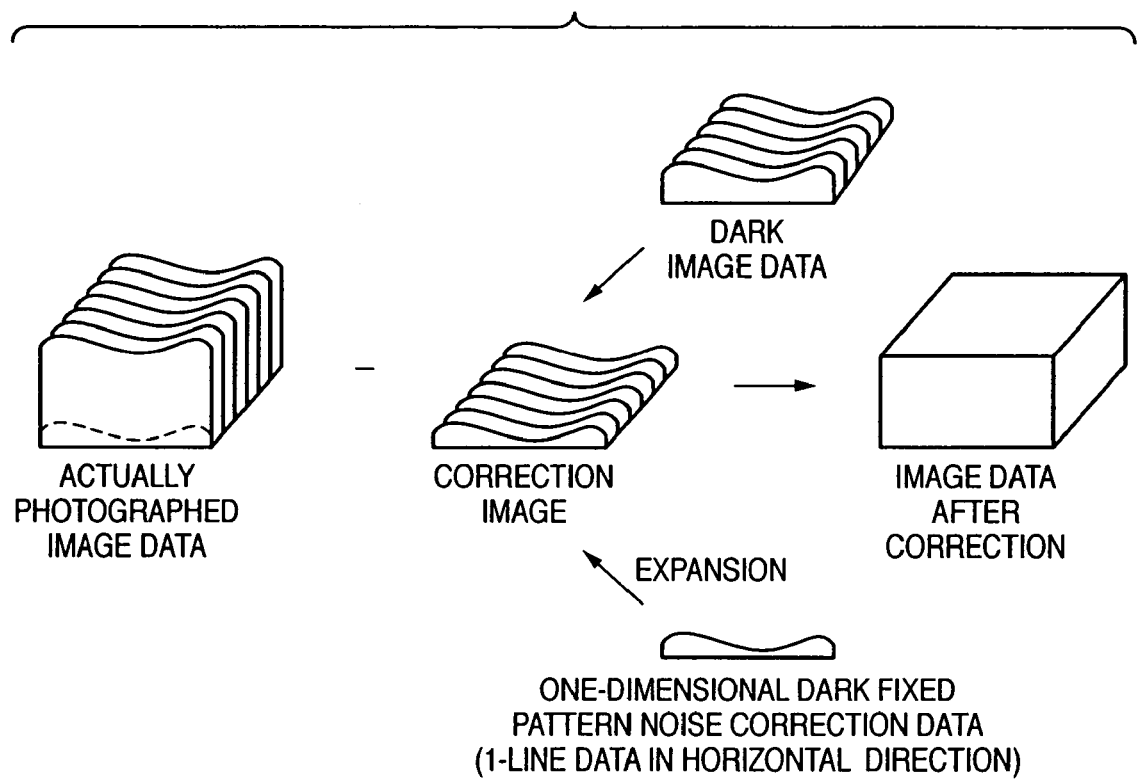
FIG. 6 is a view for explaining the difference between conventional correction of actually photographed image data based on dark subtraction and that based on one-dimensional dark fixed pattern noise correction data.

FIG. 6 is a view for explaining the difference between dark subtraction which is a conventional correction method and correction of actually photographed image data by using one-dimensional dark fixed pattern noise correction data.

As shown in FIG. 6, correction is conventionally performed by subtracting the dark image data obtained by photographing operation in an unexposed state from actually photographed image data. In contrast, in this embodiment, one-dimensional dark fixed pattern noise correction data (1-line data in the horizontal direction) is created by performing projection operation for the dark image data obtained by photographing operation in an unexposed state in the vertical direction (or horizontal direction). Actually photographed image data is then corrected by performing subtraction processing for it by using the data obtained by expanding the one-dimensional dark fixed pattern noise correction data in the horizontal direction (or vertical direction) as a correction image.

Performing subtraction processing by using one-dimensional dark fixed pattern noise correction data can prevent image quality from deteriorating due to one-dimensional dark fixed pattern noise in the horizontal direction which is produced in the image sensing device 14.

3. Outline of Image Sensing Processing

An outline of image sensing processing by the image processing apparatus 100 in FIG. 1 will be described below.

Figure 3:
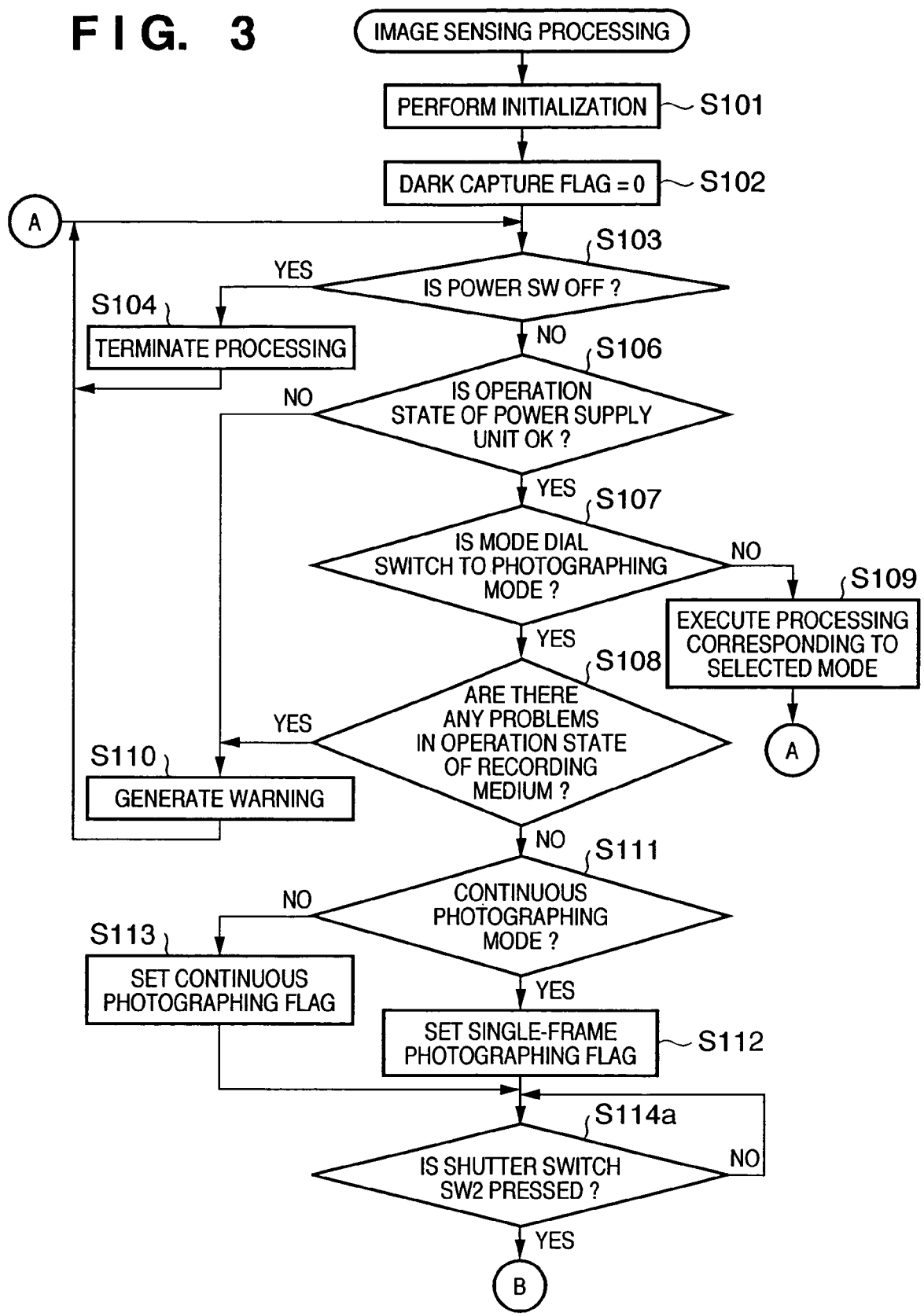
FIG. 3 is a flow chart showing the flow of image sensing processing in the image sensing apparatus in FIG. 1 according to the first embodiment.
Figure 4:
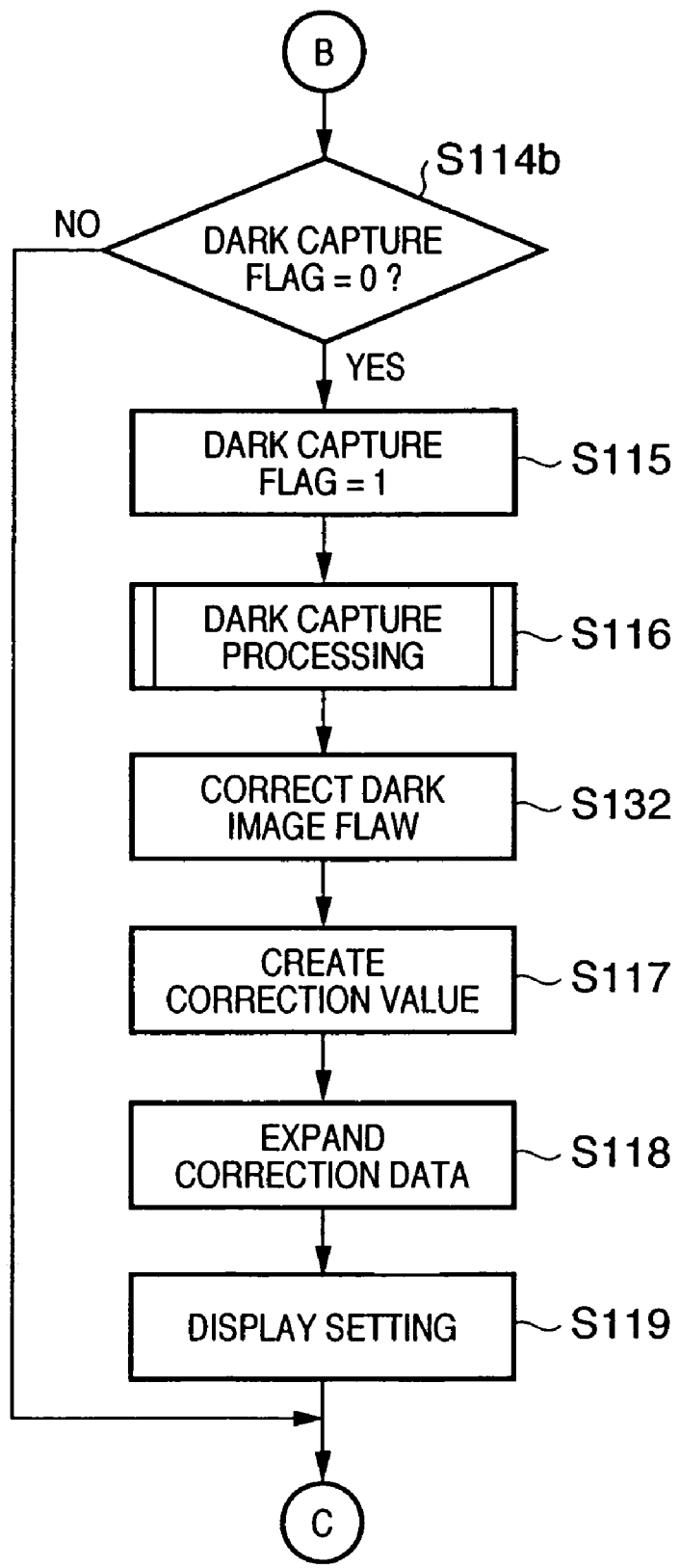
FIG. 4 is a flow chart showing the flow of image sensing processing in the image sensing apparatus in FIG. 1 according to the first embodiment.
Figure 5:
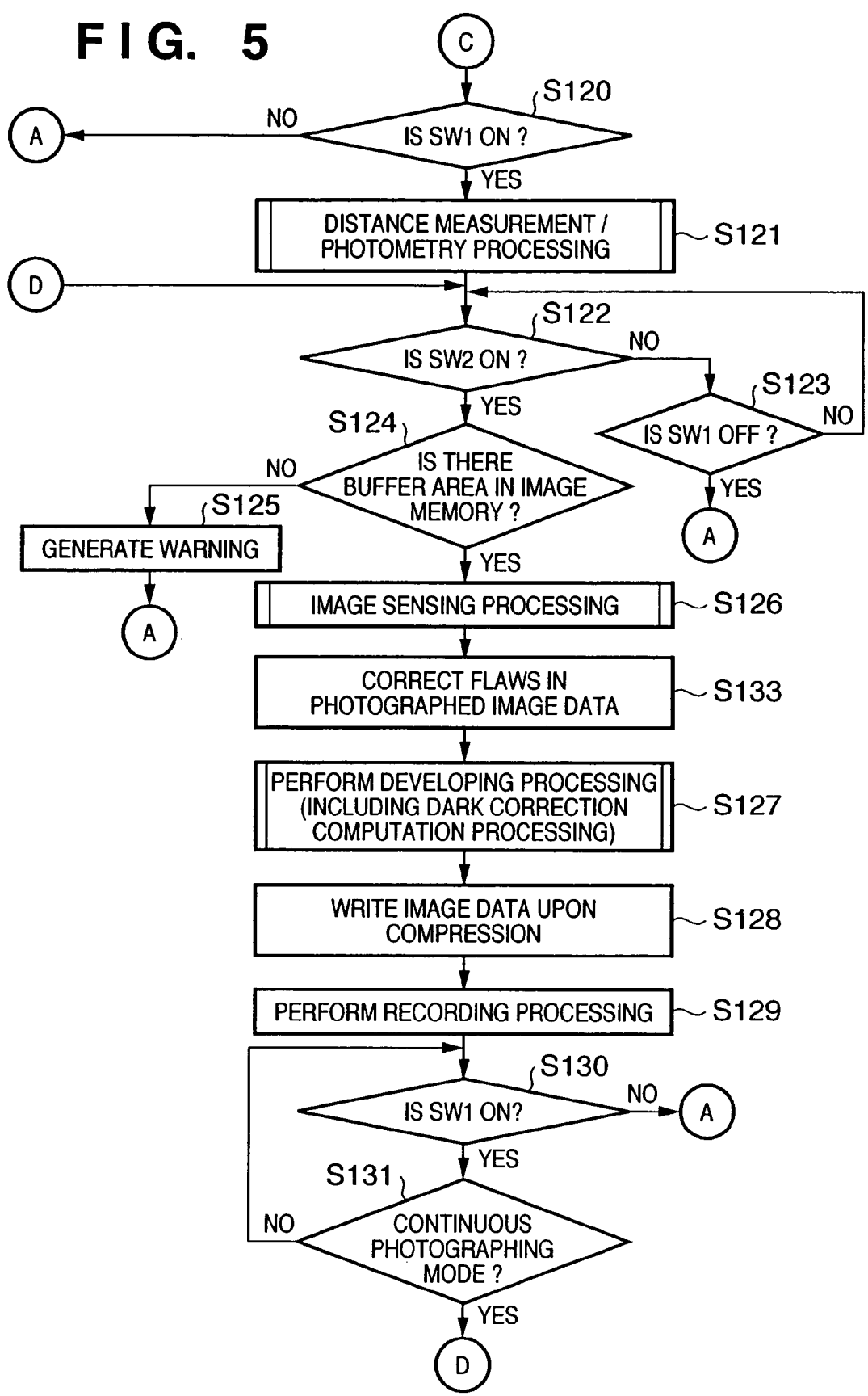
FIG. 5 is a flow chart showing the flow of image sensing processing in the image sensing apparatus in FIG. 1 according to the first embodiment.

FIGS. 3 to 5 are flow charts showing the image sensing processing in the image sensing apparatus in FIG. 1.

Referring to FIGS. 3 to 5, first of all, the system memory 52 initializes the flags, control variables, and the like stored inside when power is turned on after battery change or the like, and performs predetermined initialization necessary for each unit of the image processing apparatus 100 (step S101). Thereafter, the dark capture flag value is set to "0" (step S102).

The system control circuit 50 checks whether or not the power supply switch 72 is OFF (step S103). If the power supply switch 72 is OFF, the system control circuit 50 performs termination processing (step S104). The flow then returns to the processing from step S103. In this case, the termination processing in step S104 is the processing of changing the display on each display unit 108 to the end state, recording parameters and set values including flags, control variables, and the like, and set modes on the nonvolatile memory 56, and shutting down unnecessary power to the respective units of the image processing apparatus 100 including the image display unit 28 under the control of the power supply control unit 80.

If it is determined in step S103 that the power supply switch 72 is ON, it is checked whether there is any problem in the operation state of the power supply unit 86 (step S106). Whether there is any problem in the operation state of the power supply unit 86 is determined by causing the power supply control unit 80 to check the remaining capacity or operation of the secondary battery of the power supply unit 86.

If it is determined in step S106 that there is a problem in the operation state of the power supply unit 86, a predetermined warning is made by causing the display unit 108 to display an image or output a sound (step S110). The flow then returns to the processing from step S103. If there is no problem in the operation state of the power supply unit 86, it is checked whether the setting of the mode dial switch 60 is a photographing mode (step S107).

If it is determined in step S107 that the setting of the mode dial switch 60 is not a photographing mode, processing corresponding to the set mode is executed (step S109). Thereafter, the flow returns to the processing in step S103 and subsequent steps. If the setting of the mode dial switch 60 is a photographing mode, it is checked whether there is any problem in the operation state of the recording medium (step S108).

If it is determined in step S108 that there is a problem in the state of the recording medium, the processing in step S110 and subsequent steps is performed. More specifically, whether there is any problem in the state of the recording medium is determined by checking whether the external memories 200 and 210 are mounted, and checking the acquisition of management information of the image data recorded on the external memories 200 and 210 and the operation states of the external memories 200 and 210. This makes it possible to check whether there is any problem in the operation of the image processing apparatus 100, and more specifically, the recording/playing back of image data on/from a recording medium.

If it is determined in step S108 that there is no problem in the state of the recording medium, it is checked whether the setting of the single-frame/continuous photographing switch 68 is the single-frame photographing mode (step S111). If the setting of the single-frame/continuous photographing switch 68 is the single-frame photographing mode, the single-frame/continuous photographing flag stored in the system memory 52 is set to the single-frame photographing mode (step S112). The flow then advances to step S114a. If the setting of the single-frame/continuous photographing switch 68 is not the single-frame photographing mode (i.e., is the continuous photographing flag), the single-frame/continuous photographing flag stored in the system memory 52 is set to the continuous photographing mode (step S113). The flow then advances to step S114a. Note that the state of the single-frame/continuous photographing flag is stored in a memory incorporated in the system control circuit 50 or the system memory 52.

In step S114a, when the shutter switch SW2 is pressed, photographing operation is performed in the corresponding mode. The flow then advances to step S114b. More specifically, when the single-frame/continuous photographing flag is set to the single-frame photographing mode, and the shutter switch SW2 is pressed, one frame is photographed, and the camera is set in the standby state. When the single-frame/continuous photographing flag is set to the continuous photographing mode, and the shutter switch SW2 is pressed, photographing operation can be continuously performed while the shutter switch SW2 is pressed.

In step S114b, it is checked whether or not the value of the dark capture flag is set to "0". If it is determined that the value of the dark capture flag is not set to "0", (i.e., the value of the dark capture flag is set to "1") (NO in step S114b), the flow advances to step S120. If the value of the dark capture flag is set to "0" (YES in step S114), the value of the dark capture flag is set to "1" (step S115), and dark capture processing in FIG. 10 (to be described later) is performed to create flaw correction data (step S116).

Subsequently, flaws in the dark image data are corrected for each pixel of the sensor on the basis of the flaw correction data created in step S116 (step S132). Since small flaws are rounded off in projection operation, this correction may be performed with respect to only large flaws of the flaws in the dark image data.

In step S117, a one-dimensional dark fixed pattern noise correction value is generated. This one-dimensional dark fixed pattern noise correction data is created by, for example, a method of obtaining data corresponding to one horizontal line by performing projection operation with respect to the dark image data, obtained by dark image photographing operation, in the horizontal direction, and obtaining data corresponding to one vertical line by performing projection operation in the horizontal direction. Therefore, dark image data need not be captured with respect to the entire frame in step S116. That is, dark image data to be captured may have the minimum size that is free from the influence of random noise in projection operation. Capturing dark image data in an area having the minimum size that is free from the influence of random noise and using the data for the creation of correction data in this manner can shorten the time required for the creation of correction data than capturing dark image data of all pixels and creating correction data.

The one-dimensional dark fixed pattern noise correction data created in step S117 is repeatedly expanded in a predetermined area in the image memory 30 in the vertical direction by the number of times equal to the number of lines of the actual image (step S118). Various settings in the image processing apparatus 100 are displayed in image or voice by using the display unit 108 (step S119), and the flow advances to step S120. Note that if the image display unit 28 has an image display switch, the processing in step S119 may be performed only when the setting of the image display switch is ON. This makes it possible to greatly reduce the power consumption of the image processing apparatus 100.

It is checked in step S120 whether or not the shutter switch SW1 is ON. If the shutter switch SW1 is not ON, the flow returns to the processing in step S103 and subsequent steps. If the shutter switch SW1 is ON, distance measurement/photometry processing in FIG. 7 (to be described later) is performed (step S121). In this case, distance measurement processing is the processing of focusing the photographing lens 310 on an object by using the distance control unit 42. The photometry processing is the processing of determining the aperture value and shutter speed of the shutter 12 by using the photometry control unit 46. Note that in photometry processing, a flash setting may be made.

It is checked in step S122 whether or not the shutter switch SW2 is ON. If the shutter switch SW2 is not ON, it is checked whether or not the shutter switch SW1 is OFF. The processing in steps S122 and S123 is repeated until the shutter switch SW1 becomes OFF or the shutter switch SW2 is becomes ON. When it is determined in step S123 that the shutter switch SW1 is OFF, the flow advances to the processing in step S103.

If it is determined in step S122 that the-shutter switch SW2 is ON, the system control circuit 50 checks whether or not the image memory 30 has an image storage buffer area in which the photographed image data can be stored (step S124). If no area in which new image data can be stored is present in the image storage buffer area of the image memory 30, a predetermined warning is made by causing the display unit 108 to display an image or output a sound (step S125). The flow then returns to the processing in step S103.

For example, immediately after continuous photographing is performed up to the maximum number of frames that can be stored-in the image storage buffer area of the image memory 30, there is no area in which new image data can be stored in the image storage buffer area of the image memory 30. In this state, for example, the first image data that should be read out from the image memory 30 and written in the external memories 200 and 210 has not been recorded yet on the external memories 200 and 210, and even a free space corresponding to one frame has not been ensured on the image storage buffer area of the image memory 30.

Note that when photographed image data is to be stored in the image storage buffer area of the image memory 30 upon compression processing, it is checked whether there is any area in which the image data can be-stored in the image storage buffer area of the image memory 30, in consideration of the fact that the image data amount after compression varies depending on the compression mode setting (step S124).

If it is determined in step S124 that the image memory 30 has an image storage buffer area in which photographed image data can be stored, the system control circuit 50 executes the photography processing (to be described later with reference to FIGS. 8 and 9) of reading out image sensing signals obtained by image sensing and stored for a predetermined period of time from the image sensing device 14, and writing the photographed image data in a predetermined area of the image memory 30 through the A/D converter 16, image processing circuit 20, and memory control circuit 22 or directly from the A/D converter 16 through the memory control circuit 22 (step S126).

Subsequently, flaws in the photographed image data are corrected on a pixel basis to prevent image quality from being affected by pixel flaws in developing processing (step S133).

The system control circuit 50 performs WB (White Balance) integral computation processing and OB (Optical Black) integral computation processing necessary for developing processing by reading out part of the image data written in the predetermined area of the image memory 30 through the memory control circuit 22, and stores the computation result in the memory in the system control circuit 50 or the system memory 52.

The system control circuit 50 then reads out the actually photographed image data written in the predetermined area of the image memory 30 by using the memory control circuit 22 and, if needed, image processing circuit 20, and performs various kinds of developing processing including AWB (Automatic White Balance) processing, gamma conversion processing, and color conversion processing by using the computation result stored in the memory in the system control circuit 50 or the system memory 52 (step S127). In this developing processing, dark correction computation processing is also performed, which is subtraction processing using the one-dimensional dark fixed pattern noise correction data expanded in step S118.

The system control circuit 50 further reads out the image data written in the predetermined area of the image memory 30, performs image compression processing corresponding to the set mode by using the compression/decompression circuit 32, and writes the image data obtained by photograph operation and having undergone a series of operations in a free space in the image storage buffer area of the image memory 30 (step S128).

The system control circuit 50 performs recording processing of reading out the image data stored in the image storage buffer area of the image memory 30, and writing the readout image data in the external memories 200 and 210 such as a memory card and compact flash (registered trademark) card through the I/Fs 90 and 94 and connectors 92 and 96 (step S29). Every time image data obtained by photographing operation and having undergone a series of operations is newly written in a free space in the image storage buffer area of the image memory 30, this recording processing is executed for the image data.

While image data is written in the external memories 200 and 210, recording medium writing indication is performed by, for example, causing the display unit 108 to blink the LED to indicate that data is being written while image data is written in the external memories 200 and 210.

The system control circuit 50 also checks whether or-not the shutter switch SW1 is pressed (step S130). If the shutter switch SW1 is released (NO in step S130), the flow returns to step S103. If the shutter switch SW1 is pressed, the state of the simple-frame/continuous photographing flat stored in the memory in the system control circuit 50 or the system memory 52 is checked (step S131); If the single-frame photographing mode is set, the flow returns to step S130 to repeat the current processing until the shutter switch SW1 is released. If the continuous photographing mode is set, the flow returns to step S122 to continuously perform photographing operation, thereby preparing for the next photograph operation. With this processing, a series of operations associated with photographing operation is terminated.

4. Details of Image Sensing Processing (Distance Measurement/Photometry Processing)

Figure 7:
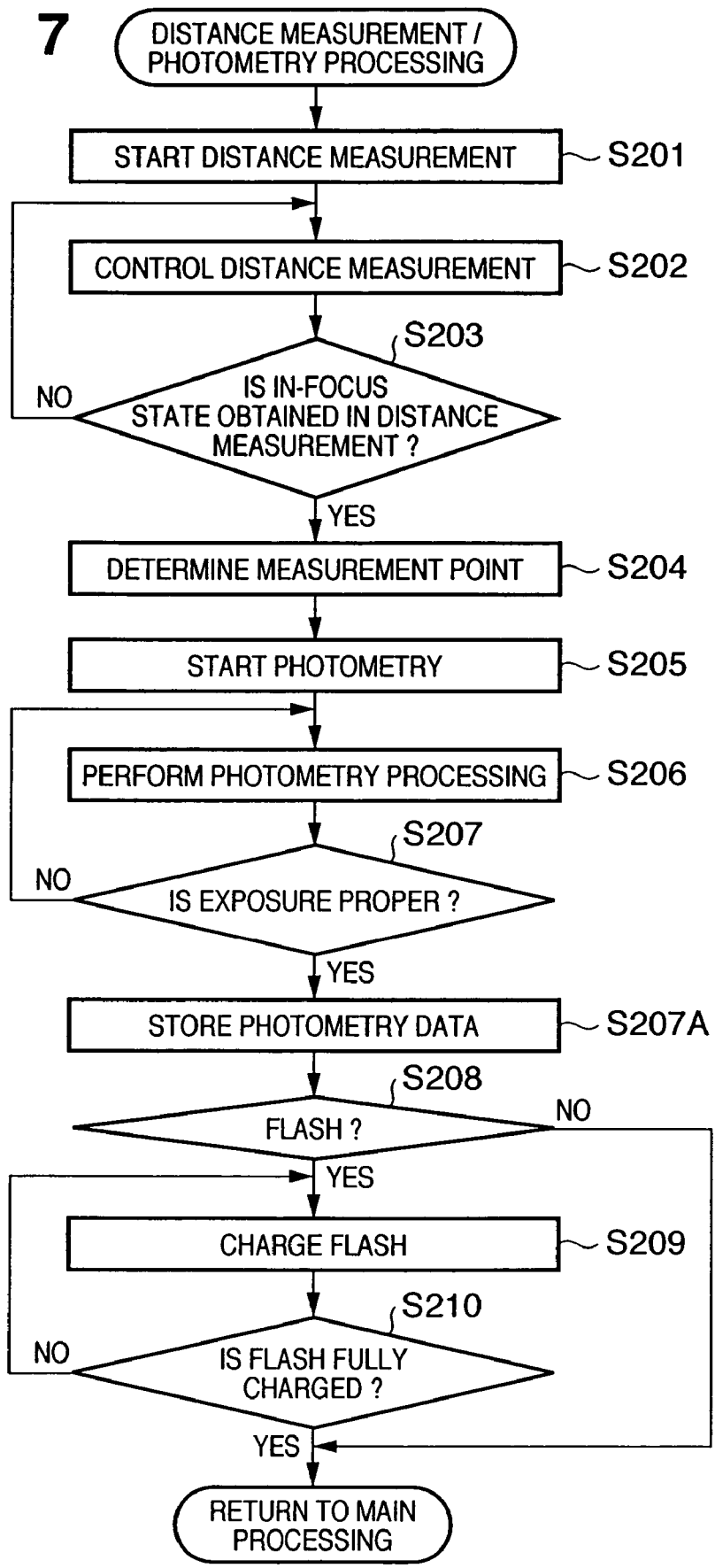
FIG. 7 is a flow chart showing distance measurement/photometry processing executed in step S121 in FIG. 5.

FIG. 7 is a flow chart showing distance measurement/photometry processing executed in step S121 in FIG. 5.

In the distance measurement/photometry processing, the system control circuit 50 and the stop control unit 340 or distance measurement control unit 342 exchange various kinds of signals through the I/F 120, connector 122, connector 322, I/F 320, and lens system control circuit unit 350.

The system control circuit 50 starts AF (AutoFocus) processing by using the image sensing device 14, distance control unit 42, and distance measurement control unit 342 (step S201).

The system control circuit 50 causes a light beam incident on the photographing lens 310 to be incident on the distance control unit 42 through the stop 312, the lens mounts 306 and 106, the mirror 130, and a sub-mirror for distance measurement (not shown), thereby determining the in-focus state of an image formed as an optical image. The system control circuit 50 keeps executing the AF control of detecting an in-focus state by using the distance control unit 42 while driving the photographing lens 310 using the distance measurement control unit 342 until an in-focus state is obtained in distance measurement (AF) (steps S202 and S203).

If it is determined that an in-focus state is obtained in distance measurement (AF) (YES in step S203), the system control circuit 50 determines one of a plurality of distance measurement points in a photographing frame at which the in-focus state is obtained, and stores the data of the determined distance measurement point and distance measurement data and/or a set parameter in the memory in the system control circuit 50 or the system memory 52 (step S204). If no in-focus state is obtained in distance measurement (NO in step S203), the flow returns to step S202.

The system control circuit 50 starts photometry by using the photometry control unit 46 (step S205). The system control circuit 50 causes a light beam incident on the photographing lens 310 to be incident on the photometry control unit 46 through the stop 312, the lens mounts 306 and 106, the mirrors 130 and 132, and a lens for photometry (not shown), thereby measuring the exposed state of an image formed as an optical image. The system control circuit 50 keeps performing photometry processing by using the shutter control unit 40 until it is determined that the exposure (AE) is proper (steps S206 and S207).

If it is determined that the exposure (AE) is proper (YES in step S207), the system control circuit 50 stores the photometry data and/or a set parameter in the memory in the system control circuit 50 or the system memory 52 (step S207A). If it is determined that the exposure (AE) is not proper (NO in step S207), the flow returns to step S206.

The system control circuit 50 determines an aperture value (Av value) and a shutter speed (Tv value) in accordance with the exposure (AE) result detected in the photometry processing in step S206 and the photographing mode set by the mode dial switch 60.

In accordance with the determined shutter speed (Tv value), the system control circuit 50 determines an electric charge storage time, and performs photographing processing and dark capture processing in this determined electric charge storage time.

In accordance with the measurement data obtained by the photometry processing in step S206, the system control circuit 50 checks whether or not a flash is required (step S208). If a flash is required, the flash flag is set to fully charge the flash unit 48 (step S209). When the flash unit 48 is fully charged (step S210), this processing is terminated, and the flow returns to the main processing. If it is determined in step S208 that the flash unit 48 has not yet been fully charged, the flow returns to step S209.

5. Details of Image Sensing Processing (Image Sensing Processing Step S126)

Figure 8:
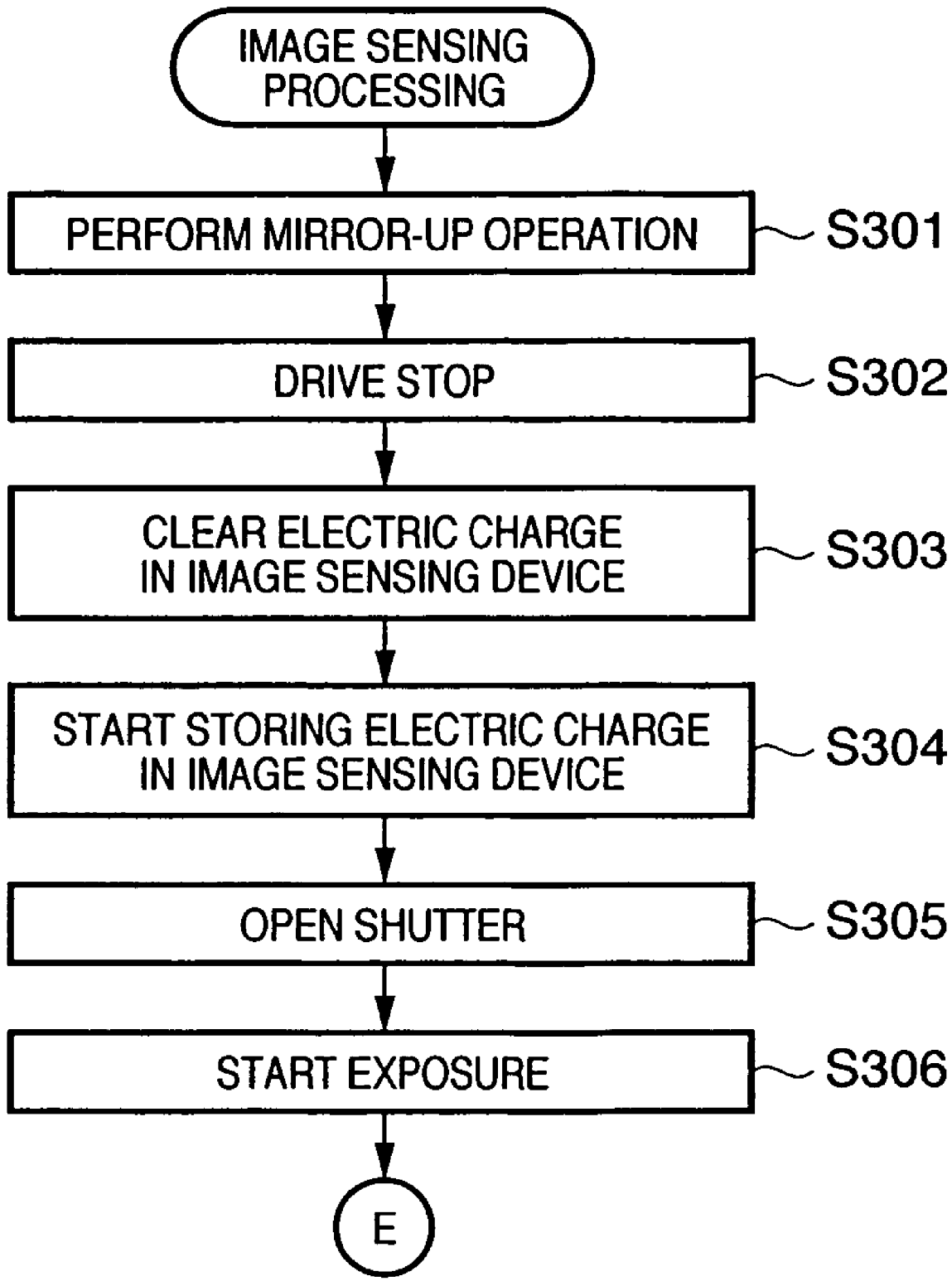
FIG. 8 is a flow chart showing image sensing processing executed in step S126 in FIG. 5.
Figure 9:
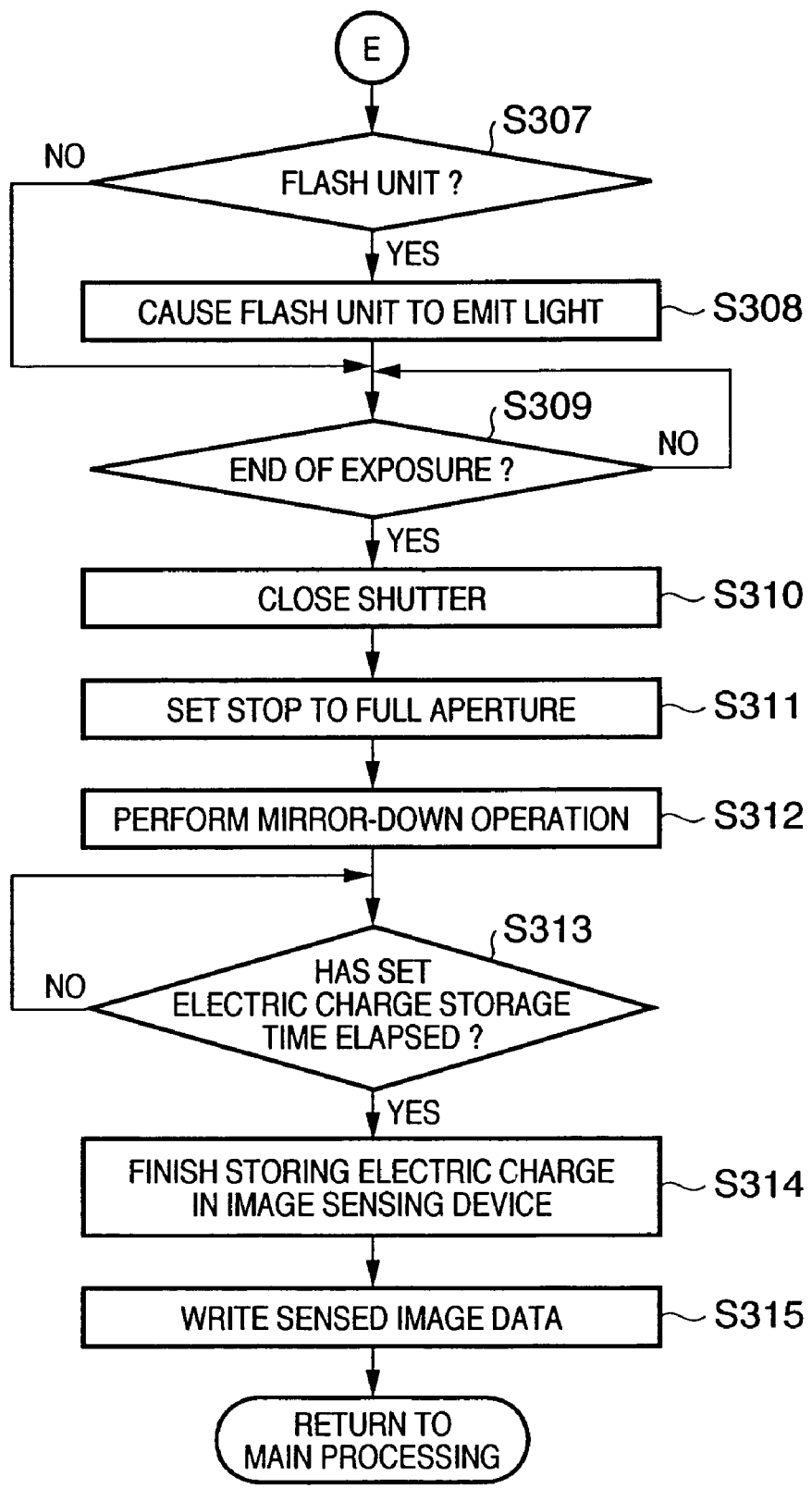
FIG. 9 is a flow chart showing image sensing processing executed in step S126 in FIG. 5.

FIGS. 8 and 9 are flow charts showing the photographing processing sequence executed in step S126 in FIG. 5.

In this photographing processing, the system control circuit 50 and the stop control unit 340 or distance measurement control unit 342 exchange various kinds of signals through the I/F 120, connector 122, connector 322, I/F 320, and lens system control circuit unit 350.

The system control circuit 50 causes a mirror driving unit (not shown) to move the mirror 130 to the mirror-up position (step S301), and also causes the stop control unit 340 to drive the stop 312 to a predetermined aperture value in accordance with the photometry data stored in the memory in the system control circuit 50 or the system memory 52 (step S302).

The system control circuit 50 clears the electric charge in the image sensing device 14 (step S303), and then starts charging the image sensing device 14 (step S304). The system control circuit 50 causes the shutter control unit 40 to open the shutter 12 (step S305), and starts exposing the image sensing device 14 (step S306).

The system control circuit 50 checks on the basis of the flash flag whether or not the flash unit 48 is required (step S307). If it is determined that the flash unit 48 is required, the flash unit 48 is caused to emit light (step S308). If it is determined that the flash unit 48 is not required, the flow advances to step S309.

When the exposure of the image sensing device 14 is completed in accordance with photometry data (YES in step S309), the system control circuit 50 causes the shutter control unit 40 to close the shutter 12 (step S310), and terminates the exposure of the image sensing device 14.

The system control circuit 50 causes the stop control unit 340 to drive the stop 312 to the full aperture value (step S311), and also causes the mirror driving unit (not shown) to move the mirror 130 to the mirror-down position (step S312).

The system control circuit 50 checks whether or not a set electric charge storage time has elapsed (step S313). If the set electric charge storage time has elapsed, the system control circuit 50 finishes charging the image sensing device 14 (step S314). The system control circuit 50 then reads an electric charge signal from the image sensing device 14, and writes the photographed image data in a predetermined area in the image memory 30 through the A/D converter 16, image processing circuit 20, and memory control circuit 22 or directly from the A/D converter 16 through the memory control circuit 22 (step S315). If it is determined in step S313 that the set electric charge storage time has not elapsed, step S313 is repeated. When a series of operations are complete, this processing is terminated, and the flow returns to the main processing.

6. Details of Image Sensing Processing (Dark Capture Processing Step S116)

Figure 10:
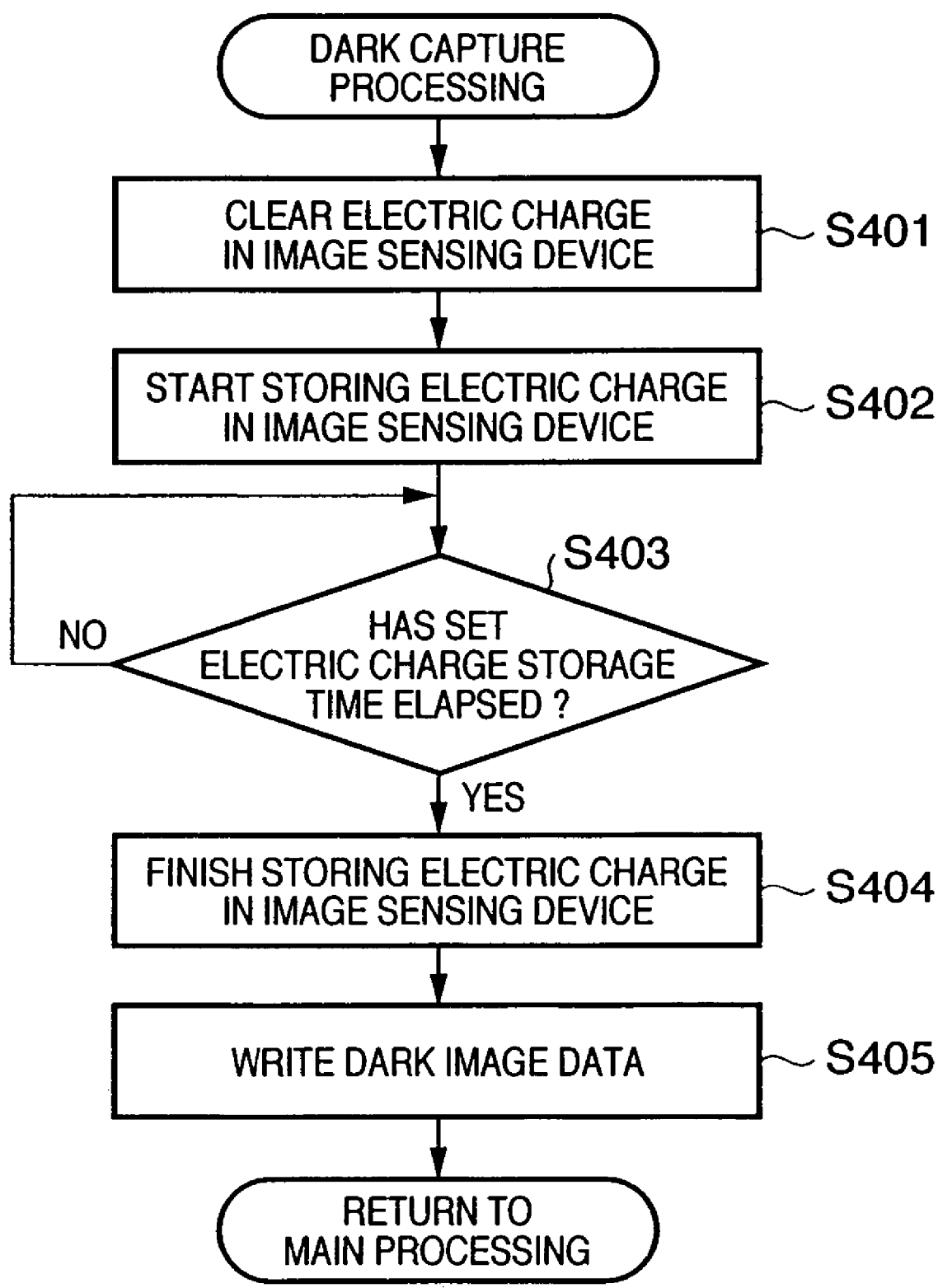
FIG. 10 is a flow chart showing dark capture processing executed in step S116 in FIG. 4.

FIG. 10 is a flow chart showing the dark capture processing sequence executed in step S116 in FIG. 4.

After clearing the electric charge in the image sensing device 14 (step S401), the system control circuit 50 starts charging the image sensing device 14 while the shutter 12 is closed (step S402). When a predetermined electric charge storage time has elapsed (YES in step S403), the system control circuit 50 finishes charging the image sensing device 14 (step S404). The system control circuit 50 then reads out an electric charge signal from the image sensing device 14, and writes the image data (dark image data) in a predetermined area in the image memory 30 through the A/D converter 16, image processing circuit 20, and memory control circuit 22 or directly from the A/D converter 16 through the memory control circuit 22 (step S405). This dark image date is used for the execution of developing processing in a state wherein photographing processing has been executed, and the photographed image data has been read from the image sensing device 14 and written in the image memory 30.

By performing developing processing (step S127) using one-dimensional dark fixed pattern noise correction data using this dark image data, photographed image data can be corrected against a deterioration in image quality such as pixel loss caused by dark current noise produced in the image sensing device 14 or flaws unique to the image sensing device 14. Thereafter, this processing is terminated, and the flow returns to the main processing.

The above description is about the first embodiment of the present invention. The present invention is not limited to the arrangement of the embodiment, however, and can be applied to any arrangement that can realize the functions defined in the appended claims or the functions of the arrangement of the embodiment. For example, in this embodiment, when correction is to be performed by using one-dimensional dark fixed pattern noise correction data (1-line data one line in the horizontal direction), the correction data is expanded in the image memory 30. Correction, however, can be performed so as to sequentially subtract one-dimensional dark fixed pattern noise correction data from actually photographed image data while loading actually photographed image data from the image sensing device 14 without performing this expansion processing.

In this embodiment, expansion processing for one-dimensional dark fixed pattern noise correction data (step S118) is performed after the shutter switch SW2 is pressed. This processing, however, may be performed after the power of the camera is turned on.

Additionally, this one-dimensional fixed pattern noise correction data is one-dimensional data in the horizontal direction. One-dimensional data in the vertical direction, however, may be used instead. Furthermore, as shown in FIG. 11 (to be described later), both one-dimensional data in the horizontal and vertical directions may be stored in advance, and when the one-dimensional data in the horizontal direction is to be expanded in the expansion processing for the correction data (step S118), the correction amount may be increased/decreased for each line by using the one-dimensional data in the vertical direction, thereby correcting one-dimensional dark fixed pattern noise in the horizontal and vertical directions.

Figure 11:
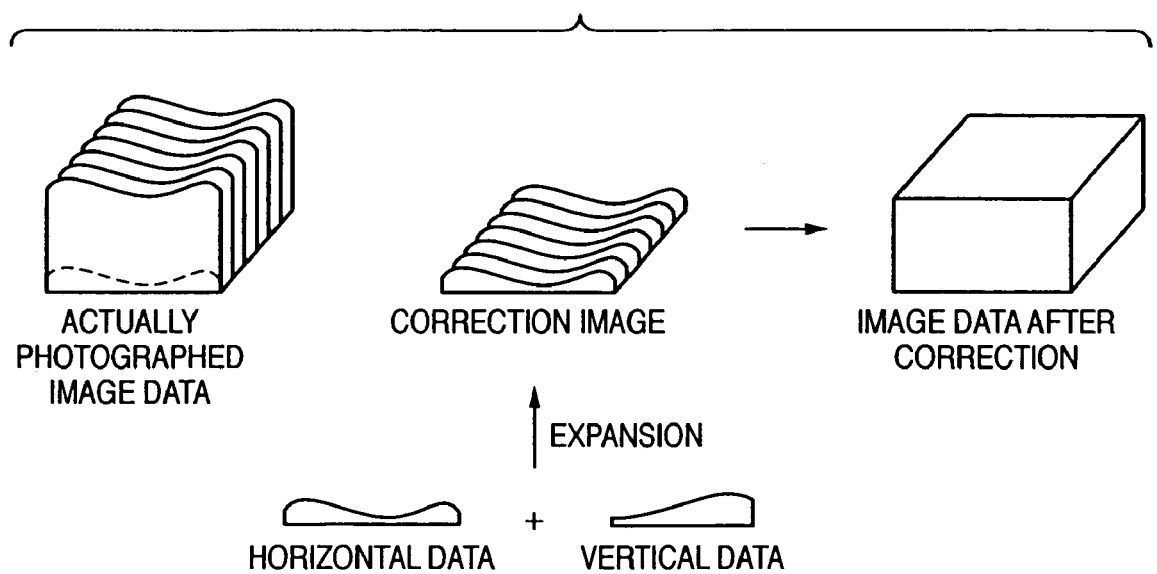
FIG. 11 is a view for explaining correction of image data at the time of actual photographing operation by using one-dimensional dark fixed pattern noise correction data in the vertical and horizontal directions.

FIG. 11 is a view for explaining how image data is corrected by using both one-dimensional data in the vertical and horizontal directions.

In this case, the data in the vertical direction may be stored as a mathematical expression instead of being stored as one-dimensional correction data, and when one-dimensional data in the horizontal direction is to be expanded, one-dimensional dark fixed pattern noise in the vertical direction may be corrected by using this mathematical expression.

The above embodiment has exemplified the case wherein the single-frame photographing mode and continuous photographing mode are switched by using the single-frame/continuous photographing switch 68. The single-frame photographing mode and continuous photographing mode, however, may be switched in accordance with the selection of an operation mode with the mode dial switch 60.

Additionally, in this embodiment, the electric charge storage time in actual photographing operation is made equal to the electric charge storage time in dark capture processing. Different electric charge storage times, however, may be set within the range in which data enough to correct dark current noise and the like can be obtained.

Furthermore, in this embodiment, photographing operation is performed upon movement of the mirror 130 to the mirror-up position or mirror-down position. However, the mirror 130 may not have a half mirror arrangement, and photographing operation may be performed without moving the mirror 130.

Moreover, the external memories 200 and 210 may be formed from optical disks such as micro DATs, magnetooptical disks, CD-Rs, and CD-RWs, phase change optical disks such as optical disks and DVDs as well as memory cards such as PCMCIA cards and compact flash (registered trademark) cards, hard disks, and the like. The external memories 200 and, 210 may be an integrated medium of a memory card and a hard disk or the like. In this case, part of the composite medium may be detachable.

In the above embodiment, the external memories 200 and 210 are separated from the image processing apparatus 100 and can be arbitrarily connected. Either or all of the recording media, however, may be fixed to the image processing apparatus 100. In addition, the present invention may have an arrangement in which a single or an arbitrary number of external memories 200 and 210 can be connected to the image processing apparatus 100.

As is obvious from the above description, according to this embodiment, one-dimensional dark fixed pattern noise correction data is created by performing projection operation in the vertical or horizontal direction with respect to the dark image data obtained by image sensing in an unexposed state, and actually photographed image data is corrected by using the one-dimensional dark fixed pattern noise correction data, thereby eliminating one-dimensional dark fixed pattern noise and preventing a deterioration in image quality.

Second Embodiment

In the first embodiment described above, in order to prevent image quality from deteriorating due to one-dimensional dark fixed pattern noise, one-dimensional dark fixed pattern noise correction data is created, and actually photographed image data is corrected by using the correction data. The created correction data, however, varies depending on the ISO sensitivity setting in dark capture operation. If, therefore, the ISO sensitivity setting in dark capture operation differs from that in actual photographing operation, the created correction data cannot be used without any modification. A case wherein actually photographed image data is to be corrected will be described.

Figure 12:
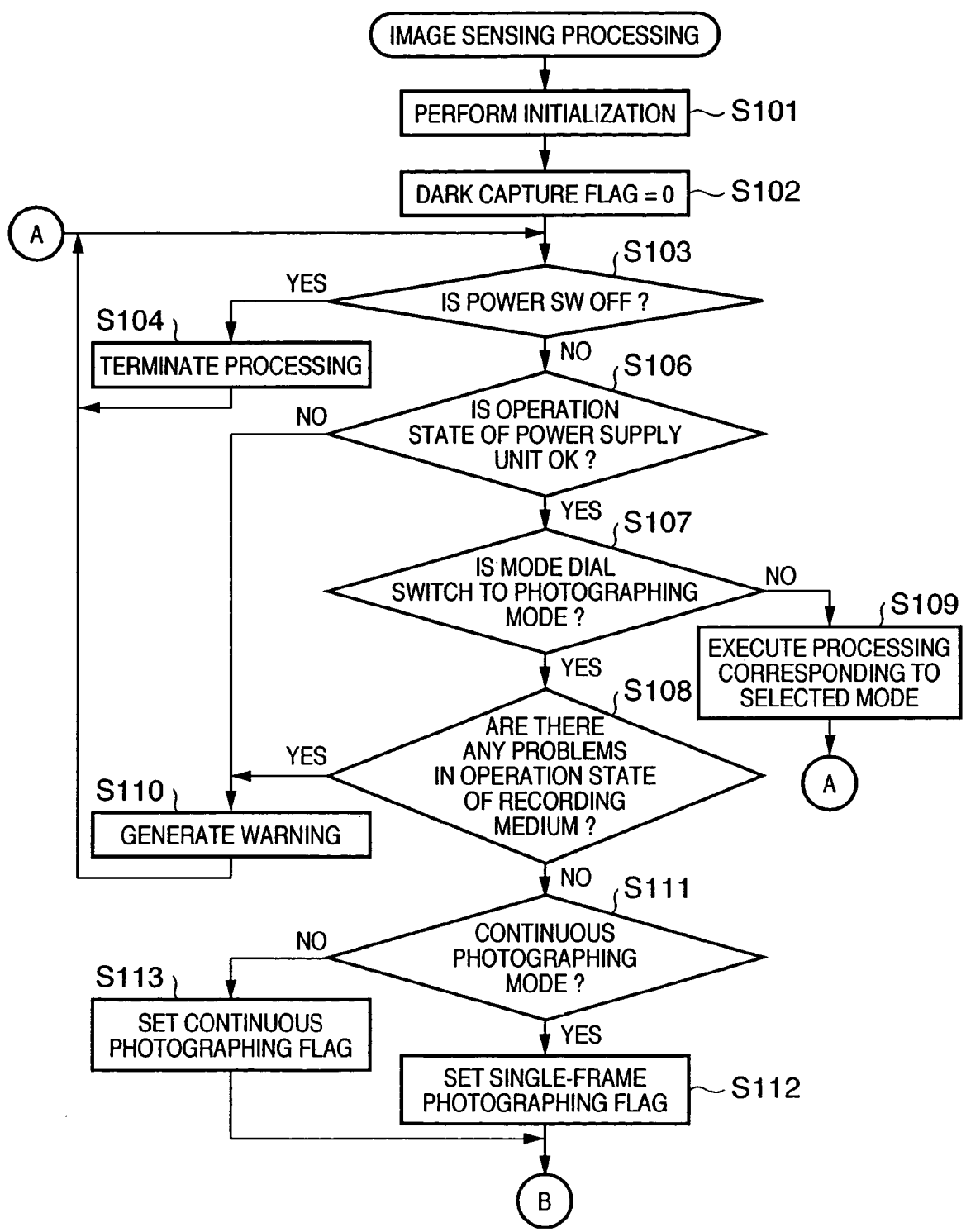
FIG. 12 is a flow chart showing the flow of image sensing processing in the image sensing apparatus in FIG. 1 according to the second embodiment.
Figure 13:
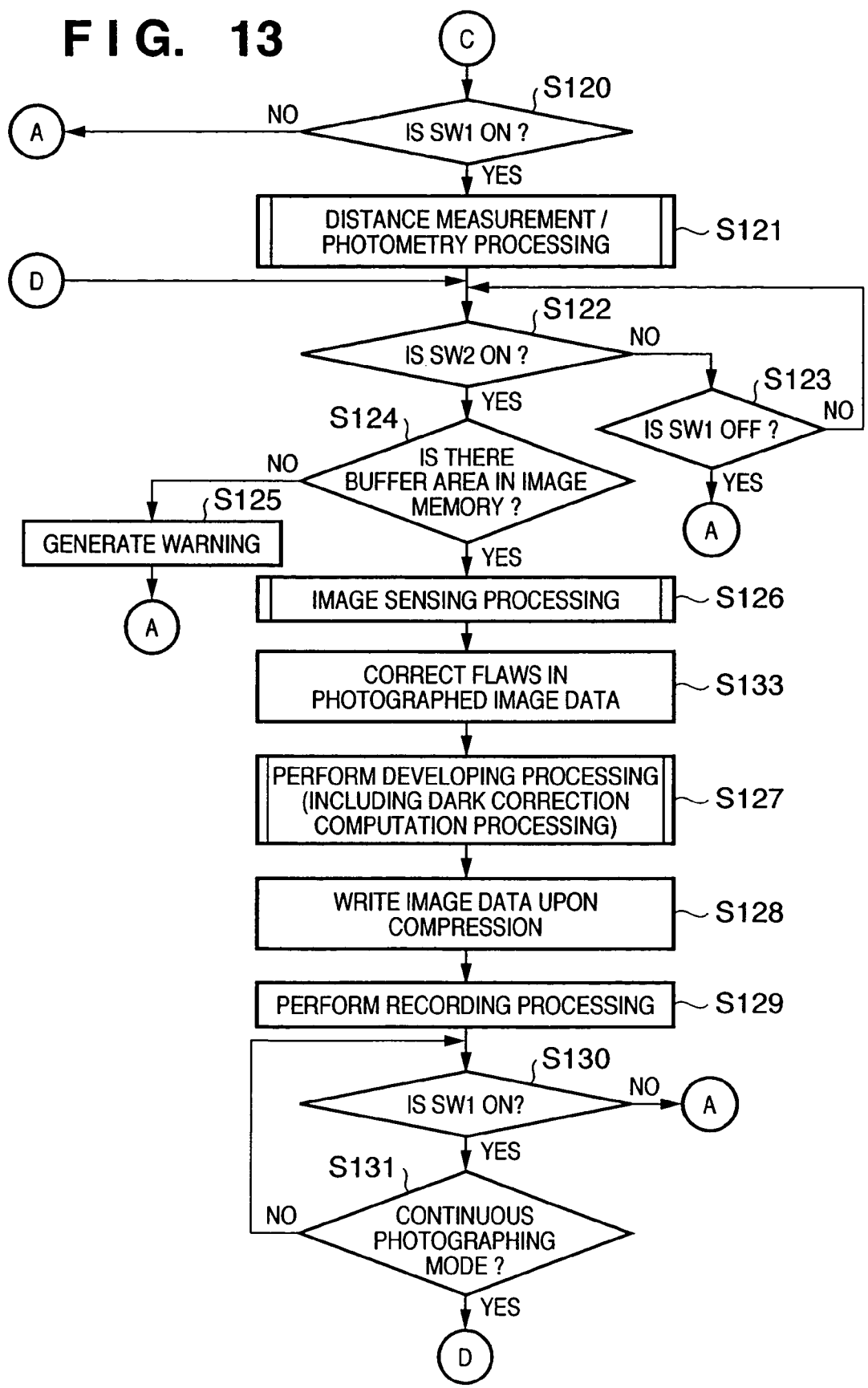
FIG. 13 is a flow chart showing the flow of image sensing processing in the image sensing apparatus in FIG. 1 according to the second embodiment.

FIGS. 12 and 13 are flow charts showing the flow of image sensing processing according to this embodiment. These flow charts are basically the same as those (FIGS. 3 to 5) which indicate the flow of image sensing processing in the first embodiment. In this embodiment, image sensing processing is executed on the assumption that one-dimensional dark fixed pattern noise correction data is stored in advance, and hence the processing in step S114a in FIG. 4 is omitted.

Figure 14:
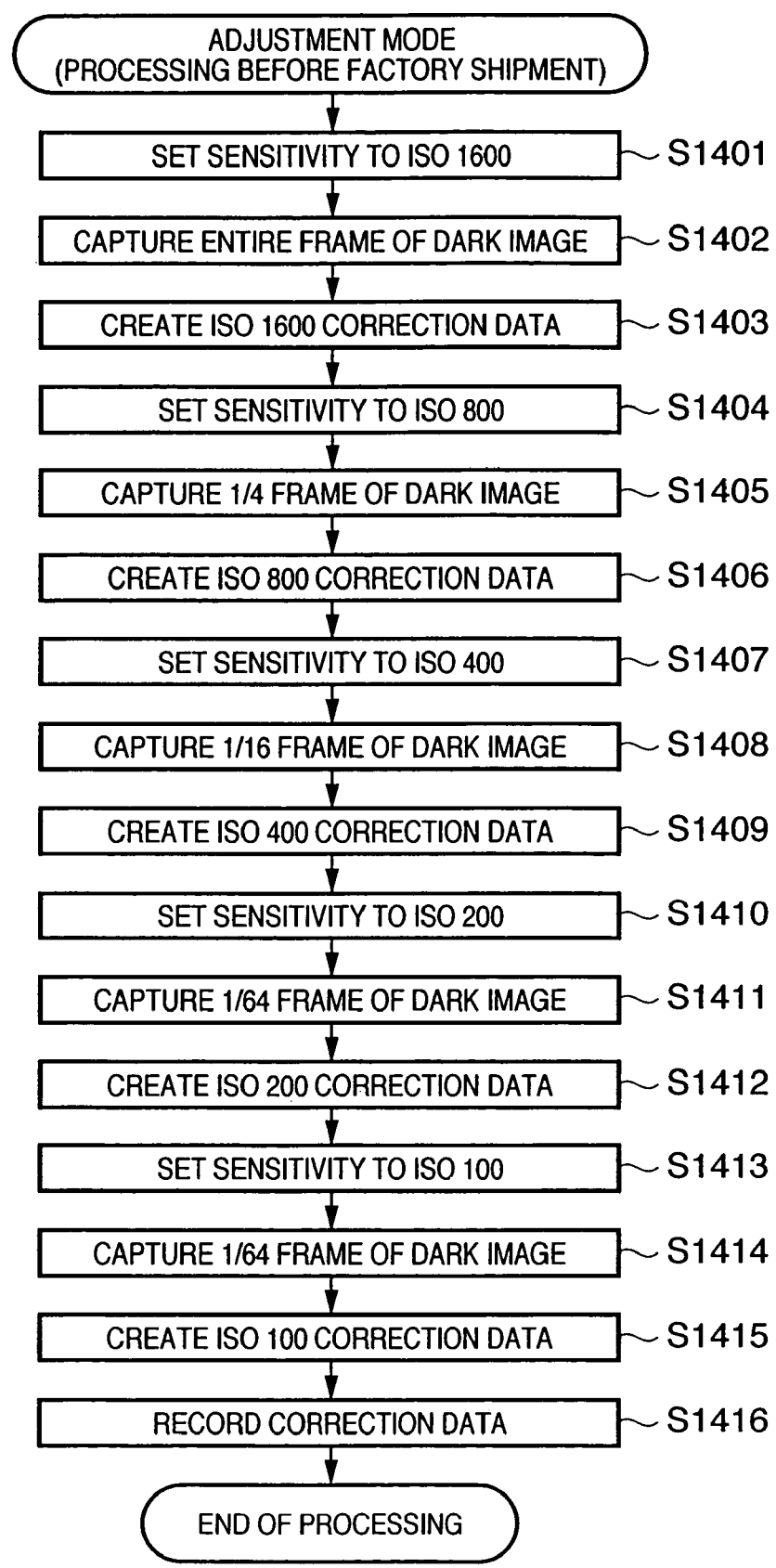
FIG. 14 is a flow chart showing the flow of processing for creating one-dimensional dark fixed pattern noise correction data used in the image sensing processing shown in FIGS. 12 and 13.

FIG. 14 is a flow chart showing the flow of processing for creating one-dimensional dark fixed pattern noise correction data used in the image sensing processing shown in FIG. 13. This embodiment is based on the assumption that this processing is executed in advance before factory shipment after the manufacture of the image sensing apparatus.

As shown in FIG. 14, the sensitivity of the image sensing apparatus is set to ISO 1600, and dark image data corresponding to an entire frame is captured in step S1402 while a shutter 12 is closed and no exposure is performed. In step S1403, one-dimensional dark fixed pattern noise correction data is created from the dark image data corresponding to the entire frame captured in step S1402 by projection operation.

In step S1404, the sensitivity of the image sensing apparatus is set to ISO 800. In step S1405, data corresponding to ¼ of the-frame of dark image data is captured in the same as in step S1402. In step S1406, one-dimensional dark fixed pattern noise correction data is created from the dark image data corresponding to ¼ of the frame captured in step S1405 by projection operation.

When the ISO sensitivity is reduced to ½, it suffices to create data corresponding to ¼ of one-dimensional dark fixed pattern noise correction data. This is because random noise due to averaging is reduced in square root.

Likewise, in step S1407, the sensitivity of the image sensing apparatus is set to ISO 400. In step S1408, data corresponding to 1/16 of the frame of dark image data is captured in the same manner as in step S1402. In step S1409, one-dimensional dark fixed pattern noise correction data is created from dark image data corresponding to 1/16 of the frame captured in step S1408 by projection operation.

In step S1410, the sensitivity of the image sensing apparatus is set to ISO 200. In step S1411, data corresponding to 1/64 of the frame of dark image data is captured in the same manner as in step S1402.

In step S1412, one-dimensional dark fixed pattern noise correction data is created from dark image data corresponding to 1/64 of the frame captured in step S1411 by projection operation.

In step S1413, the sensitivity of the image sensing apparatus is set to ISO 100. In step S1414, data corresponding to 1/64 of the frame of dark image data is captured in the same manner as in step S1402. In step S1415, one-dimensional dark fixed pattern noise correction data is created from dark image data corresponding to 1/64 of the frame captured in step S1414 by projection operation.

The reason why both one-dimensional dark fixed pattern noise correction data under ISO 100 and ISO 200 are obtained from 1/64 of the frame is that with a too small amount of correction data, image data becomes susceptible to the influences of damaged pixels and the like other than random noise. In addition, no problem occurs in terms of time because it takes only a short period of time.

Finally, in step S1416, the one-dimensional dark fixed pattern noise correction data under each ISO sensitivity is recorded on a nonvolatile memory 56.

As described above, preparing one-dimensional dark fixed pattern noise correction data for the respective ISO sensitivities in the image sensing apparatus before factory shipment makes it possible to switch the one-dimensional dark fixed pattern noise correction data in accordance with the switching of the ISO sensitivities. Just for reference, FIG. 20 shows an example of the range of dark image data required to create correction data for the respective ISO sensitivities. In this case, horizontal correction data is created by projection operation in the vertical direction.

Figure 15:
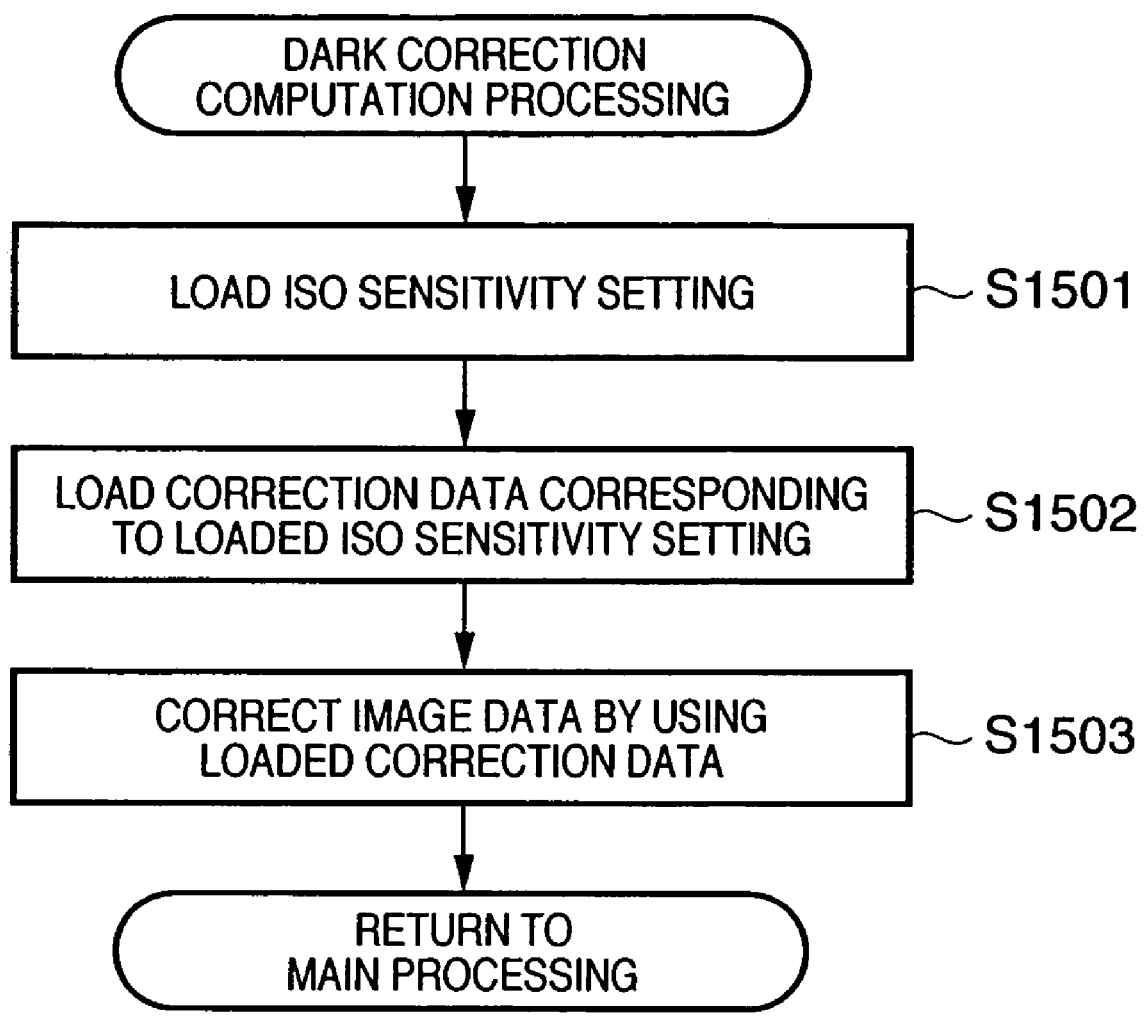
FIG. 15 is a flow chart showing dark correction computation processing executed in step S127 in FIG. 13.

FIG. 15 is a flow chart showing the details of dark correction computation processing (step S127) in the image sensing apparatus in which one-dimensional dark fixed pattern noise correction data for each ISO sensitivity setting is prepared by executing the processing shown in FIG. 14.

As shown in FIG. 15, in step S1501, the ISO sensitivity setting at the time of actual photographing operation is loaded. In step S1502, one-dimensional dark fixed pattern noise correction data corresponding to the loaded ISO sensitivity setting is loaded. In step S1503, the actually photographed image data is corrected by using the loaded one-dimensional dark fixed pattern noise correction data.

Third Embodiment

In the second embodiment, the image sensing apparatus in which one-dimensional dark fixed pattern noise correction data for each ISO sensitivity setting is prepared in advance has been described. The present invention, however, is not limited to this, and correction data may be created before actual photographing operation.

Figure 16:
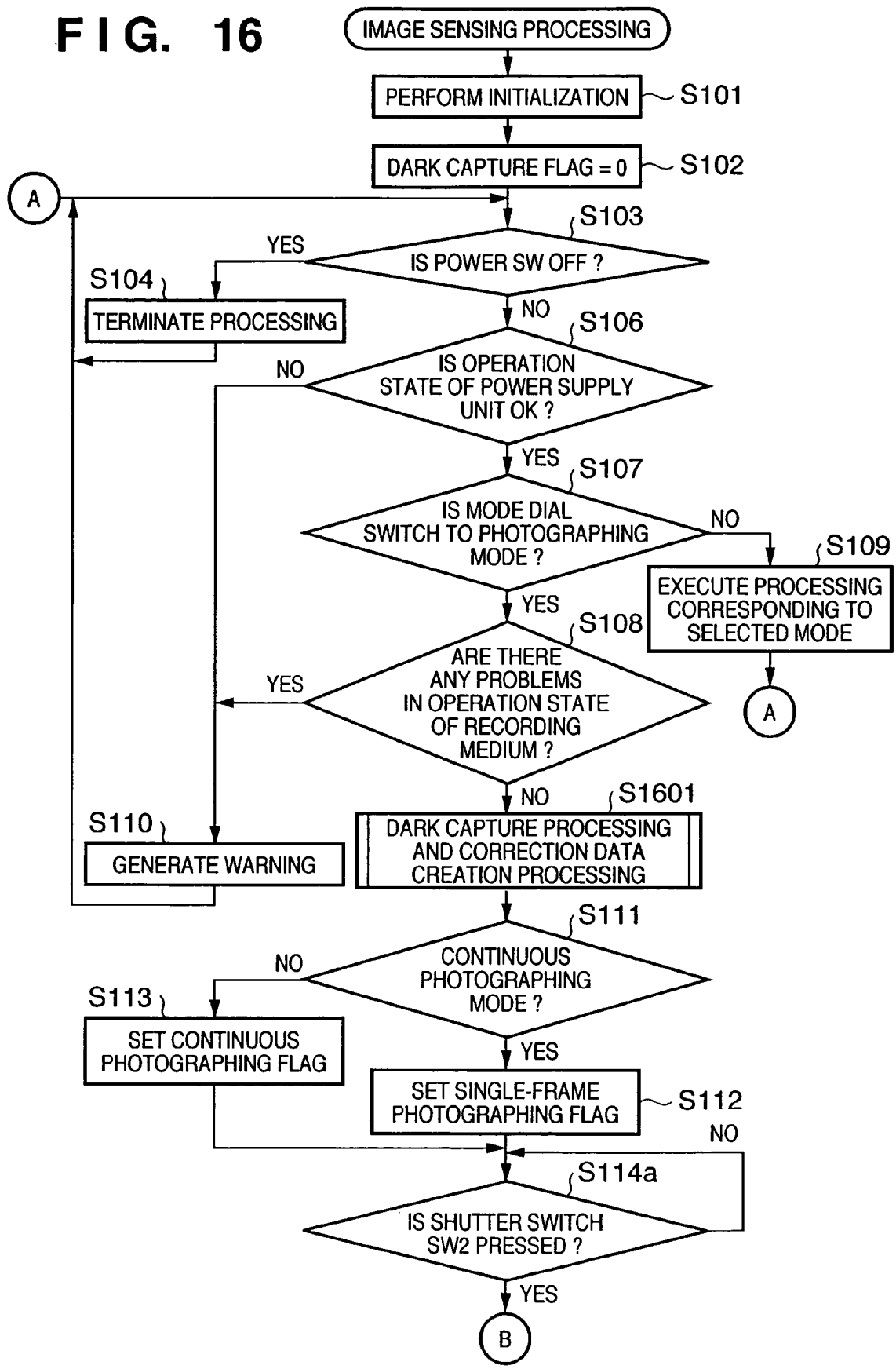
FIG. 16 is a flow chart showing the flow of image sensing processing in the image sensing apparatus in FIG. 1 according to the third embodiment.
Figure 17:
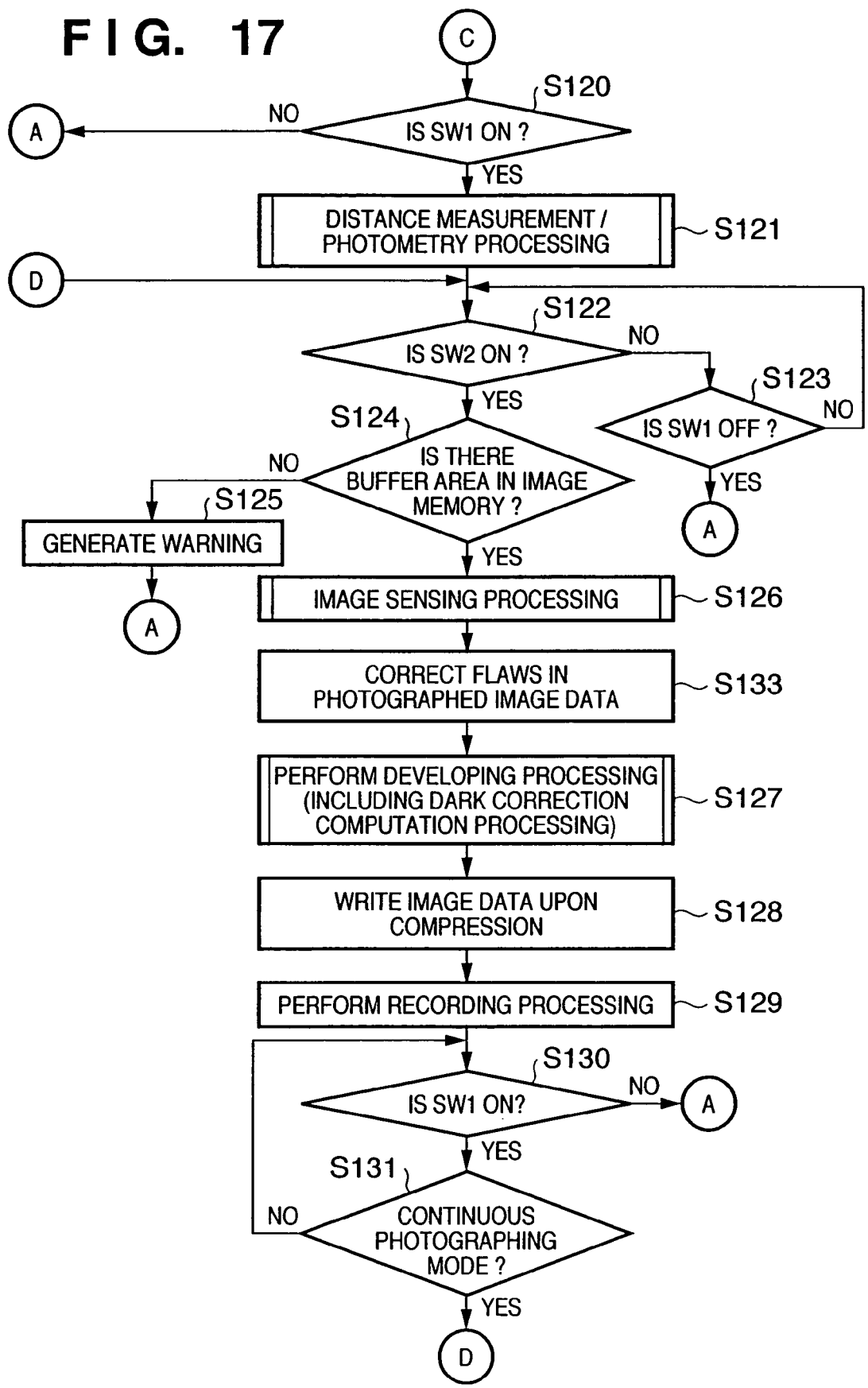
FIG. 17 is a flow chart showing the flow of image sensing processing in the image sensing apparatus in FIG. 1 according to the third embodiment.

FIGS. 16 and 17 are flow charts showing the flow of image sensing processing in a case wherein one-dimensional dark fixed pattern noise correction data is created after a power supply SW of the image sensing apparatus is turned on. This processing is wherein if it is determined in step S108 that there is no problem in the operation state of a recording medium, dark capture processing and correction data creation processing are executed in step S1601. Note that processing other than step S1601 is the same as that in FIGS. 13 and 14, and hence a description thereof will be omitted.

Figure 18:
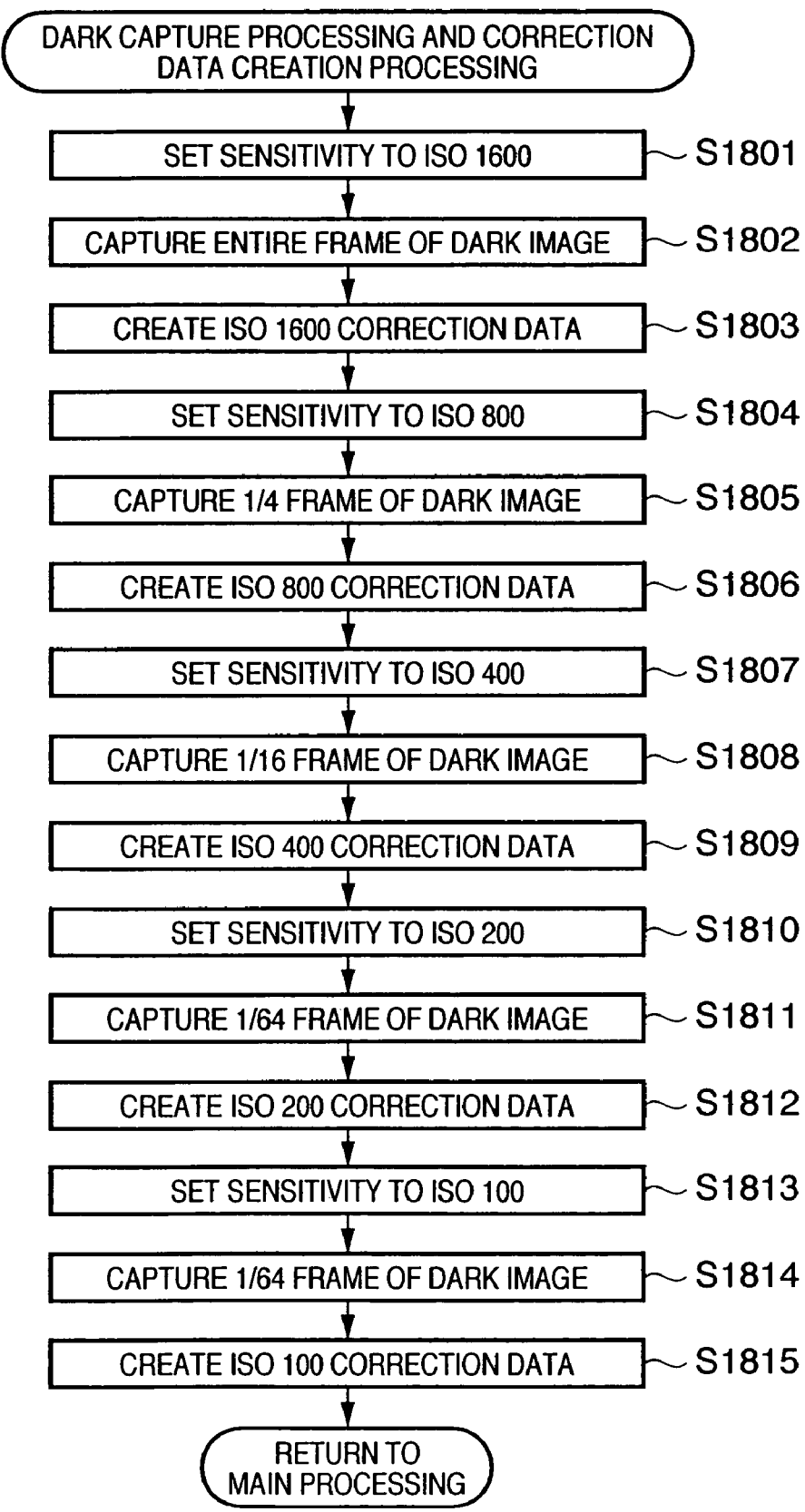
FIG. 18 is a flow chart showing dark capture processing and correction data creation processing executed in step S1601 in FIG. 16.

FIG. 18 is a flow chart showing the details of dark capture processing and correction data creation processing in step S1601.

Referring to FIG. 16, the sensitivity of the image sensing apparatus is set to ISO 1600 in step S1801. In step S1802, dark image data corresponding to an entire frame is captured while a shutter 12 is closed and no exposure is performed. In step S1803, one-dimensional dark fixed pattern noise correction data is created from the dark image data corresponding to the entire frame captured in step S1802 by projection operation.

In step S1804, the sensitivity of the image sensing apparatus is set to ISO 800. In step S1805, data corresponding to ¼ of the frame of the dark image data is captured in the same manner as in step S1802. In step S1806, one-dimensional dark fixed pattern noise correction data is created from the dark image data corresponding to ¼ of the frame captured in step S1805.

When the ISO sensitivity is reduced to ½, it suffices to create data corresponding to ¼ of one-dimensional dark fixed pattern noise correction data. This is because random noise due to averaging is reduced in square root.

Likewise, in step S1807, the sensitivity of the image sensing apparatus is set to ISO 400. In step S1808, data corresponding to 1/16 of the frame of dark image data is captured in the same manner as in step S1802. In step S1809, one-dimensional dark fixed pattern noise correction data is created from dark image data corresponding to 1/16 of the frame captured in step S1808 by projection operation.

In step S1810, the sensitivity of the image sensing apparatus is set to ISO 200. In step S1811, data corresponding to 1/64 of the frame of dark image data is captured in the same manner as in step S1802.

In step S1812, one-dimensional dark fixed pattern noise correction data is created from dark image data corresponding to 1/64 of the frame captured in step S1811 by projection operation. This makes it possible to set a signal capturing area in accordance with the ISO sensitivity setting, and hence to shorten the time required for the creation of correction data.

In step S1813, the sensitivity of the image sensing apparatus is set to ISO 100. In step S1814, data corresponding to 1/64 of the frame of dark image data is captured in the same manner as in step S1802. In step S1815, one-dimensional dark fixed pattern noise correction data is created from dark image data corresponding to 1/64 of the frame captured in step S1814 by projection operation.

The reason why both one-dimensional dark fixed pattern noise correction data under ISO 100 and ISO 200 are obtained from 1/64 of the frame is that with a too small amount of correction data, image data becomes susceptible to the influences of damaged pixels and the like other than random noise. In addition, no problem occurs in terms of time because it takes only a short period of time.

Creating one-dimensional dark fixed pattern noise correction data for each ISO sensitivity setting in this manner makes it possible to improve the correction precision and further prevent a deterioration in image quality as compared with a case wherein such correction data are created before factory shipment (the second embodiment).

Fourth Embodiment

In the third embodiment, after the power supply switch 72 is turned on, one-dimensional dark fixed pattern noise correction data for all the ISO sensitivity settings are created. The present invention is not, however, limited to this. For example, one-dimensional dark fixed pattern noise correction data may be created after the execution of image sensing processing (step S126). In addition, there is no need to create one-dimensional dark fixed pattern noise correction noise for all the ISO sensitivity settings. When dark image photographing operation is performed after actual photographing processing, only dark image photographing operation for the same ISO sensitivity setting as that made at the time of the photographing operation may be performed to create one-dimensional dark fixed pattern noise correction data. Furthermore, one-dimensional dark fixed pattern noise correction data need not be created after every actual photographing processing, and correction data may be created only when a predetermined period of time has elapsed from the time point at which one-dimensional dark fixed pattern noise correction data is created.

Figure 19:
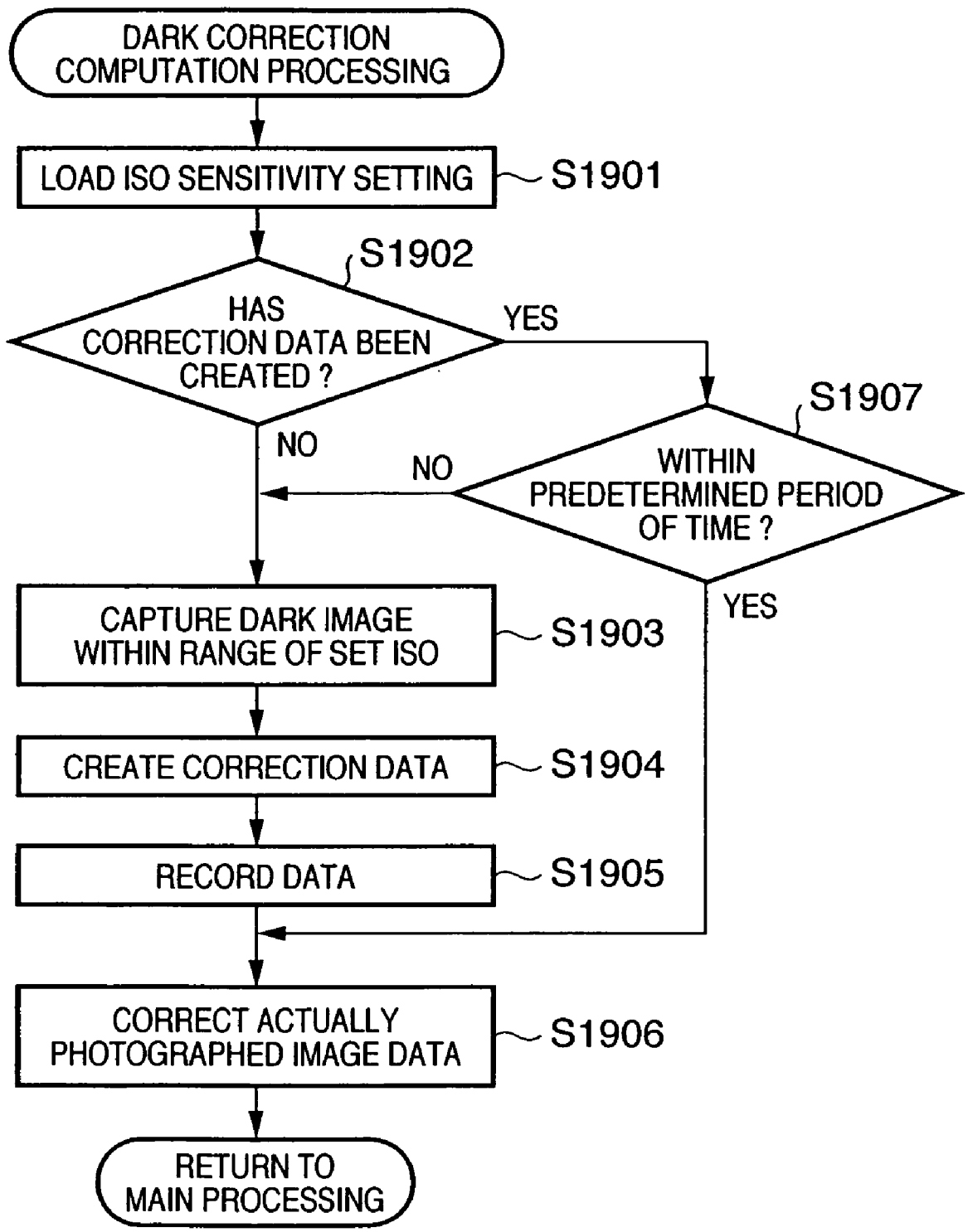
FIG. 19 is a flow chart showing dark correction computation processing executed in step S127 in FIG. 17 (fourth embodiment)

FIG. 19 is a flow chart showing the flow of dark correction computation processing (step S127) for correcting actually photographed image data by creating one-dimensional dark fixed pattern noise correction data on the basis of this point of view.

As shown in FIG. 19, the ISO sensitivity setting made at the time of actual photographing operation is loaded in step S1901. In step S1902, it is checked whether or not one-dimensional dark fixed pattern noise correction data corresponding to the loaded ISO sensitivity setting has already been created.

If it is determined in step S1902 that one-dimensional dark fixed pattern noise correction data has already been created, the flow advances to step S1907 to check whether or not a predetermined period of time has elapsed after the creation of the one-dimensional dark fixed pattern noise correction data. Note that the predetermined period of time is a time during which one photographing scene is expected to continue. This is because one-dimensional dark fixed pattern noise correction data within the predetermined period of time can be regarded as having undergone a small change in conditions, and hence can be used for correction.

If, therefore, it is determined in step S1907 that the predetermined period of time has not elapsed yet, the flow advances to step S1906 to correct the actually photographed image data by using the above correction data.

If it is determined in step S1902 that no one-dimensional dark fixed pattern noise correction data has been created, or it is determined in step S1907 that the predetermined period of time has elapsed, the flow advances to step S1903 to capture dark image data so as to create one-dimensional dark fixed pattern noise correction data corresponding to the set ISO sensitivity setting. In step S1904, one-dimensional dark fixed pattern noise correction data is created. In step S1905, the created correction data is recorded.

Subsequently, the flow advances to step S1906 to correct the actually photographed image data by using the correction data created in step S1904.

Fifth Embodiment

In the first to fourth embodiments, when dark image data is to be captured, 1-frame dark image data is captured. The present invention, however, is not limited to this. The number of frames to be captured may be set in advance, and dark image data may be captured by an amount corresponding to the set number of frames.

Figure 21:
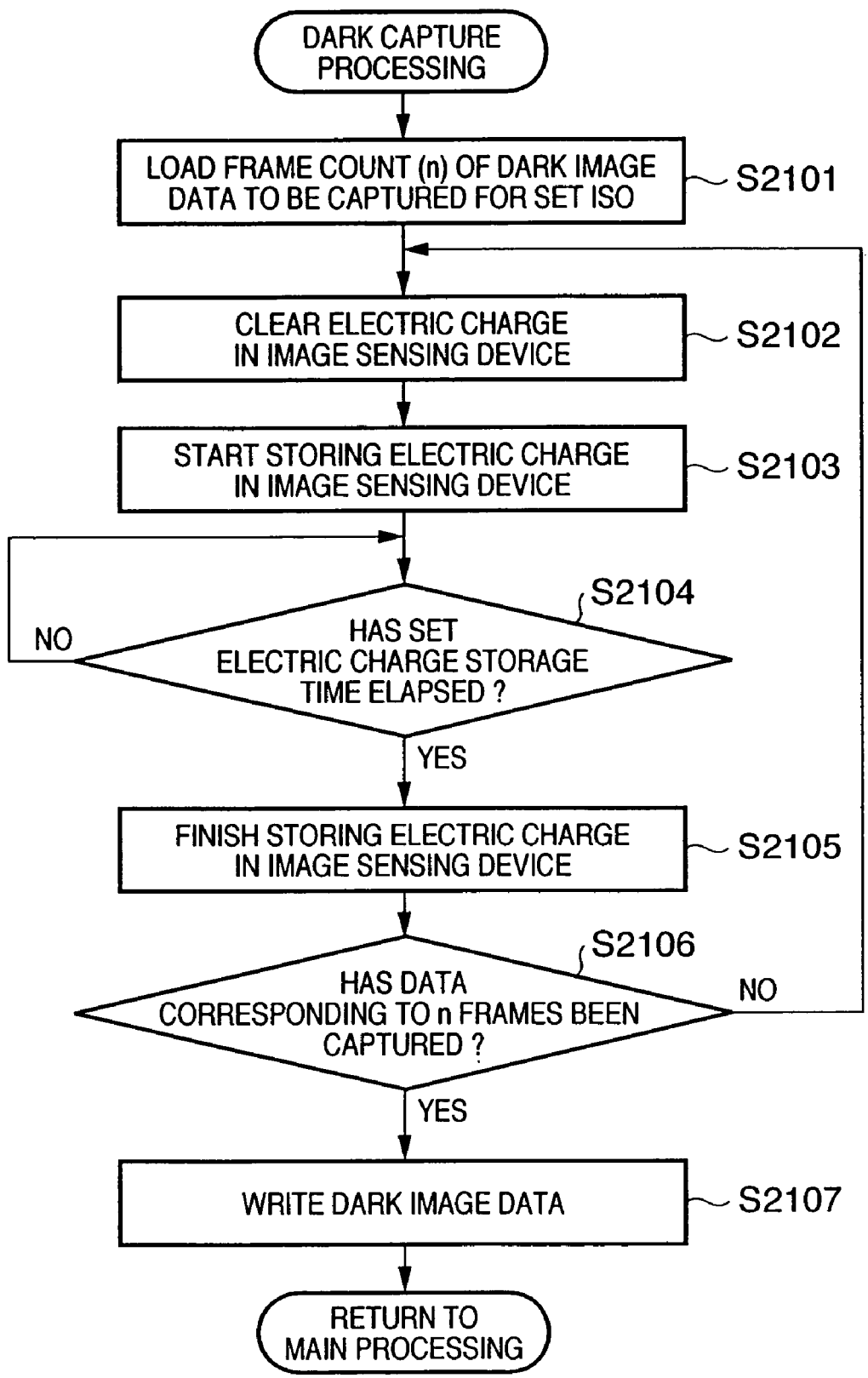
FIG. 21 is a flow chart showing dark capture processing executed in step S1402 in FIG. 14, step S1802 in FIG. 18, or the like (fifth embodiment).

FIG. 21 is a flow chart showing the flow of processing in dark capture processing executed in, for example, step S1402 in FIG. 14 or step S1802 in FIG. 18, in a case wherein dark image data corresponding to a preset number of frames are to be captured.

Referring to FIG. 21, in step S2101, the number of images to be captured (the number of frames) which is set in accordance with the ISO sensitivity setting is loaded. Assume that the number of frames is set to one with ISO 100; two with ISO 200; and four with ISO 400.

Subsequently, a system control circuit 50 clears the electric charge in an image sensing device 14 (step S2102). The system control circuit 50 then starts charging the image sensing device 14 while a shutter 12 is closed (step S2103). When a predetermined electric charge storage time has elapsed (YES in step S2104), the system control circuit 50 finishes charging the image sensing device 14 (step S2105), and reads an electric charge signal from the image sensing device 14.

In step S2101, it is checked whether or not data corresponding to a loaded frame count (n) have been captured (step S2106). If the data have not been captured yet, the flow returns to step S2102.

If it is determined in step S2101 that the data corresponding to the loaded frame count (n) have been captured, the image data (dark image data) are written in a predetermined area in an image memory 30 (step S2107). Subsequently, this processing is terminated, and the flow returns to the main processing.

Other Embodiment

The present invention can also be applied to a case wherein software program codes for realizing the functions of the above embodiments are supplied to a system or apparatus. In this case, the program codes themselves realize the novel functions of the present invention, and the program itself and a storage medium storing the program constitute the present invention.

In the above embodiments, the program codes shown in the flow charts of FIGS. 3 to 5, 7, 8, 10, 12 to 19, and 21 are stored in a ROM as a recording medium. The recording medium for supplying the program codes is not limited to the ROM. For example, a flexible disk, hard disk, nonvolatile memory card, and the like can be used.

The present invention can be realized by loading software programs (the flow charts of FIGS. 3 to 5 and the like) for realizing the functions of the above embodiments into the system memory 52, supplying them to the CPU in the system control circuit 50, and causing the CPU to read out the supplied programs and execute them.

In this case, the above programs are directly supplied from the storage medium on which the programs are recorded or supplied by being downloaded from another computer or database (not shown) connected to the Internet, a commercial network, a local area network, or the like.

The above programs may take the form of object codes, program codes executed by an interpreter, script data supplied to an OS (Operating System), or the like.

The object of the present invention can also be realized even by supplying a storage medium storing the software programs for realizing the functions of the above embodiments to a CPU and causing the CPU to read out and execute the programs stored in the storage medium.

In this case, the program codes themselves read out from the storage medium realize the functions of the respective embodiments described above, and the storage medium storing the program codes constitutes the present invention.

As a storage medium storing the program codes, for example, a ROM, RAM NV-RAM, floppy (registered trademark) disk, hard disk, optical disk, magnetooptical disk, CD-ROM, MO, CD-R, CD-RW, DVD-ROM, DVD-RAM, DVD-RW, DVD+RW, magnetic tape, and nonvolatile memory card can be used.

The functions of the above embodiments can be realized not only when the program codes read out from the computer are executed but also when the OS (Operating System) or the like running on the computer performs part or all of actual processing on the basis of the instructions of the program codes.

The present invention is not limited to the above embodiments and various changes and modifications can be made within the spirit and scope of the present invention. Therefore, to apprise-the public of the scope of the present invention, the following claims are made.

What is claimed is:

1. An image sensing apparatus comprising:
   a plurality of pixels arrayed in a horizontal and a vertical direction;
   a storage unit configured to store a plurality of one-dimensional correction data in a horizontal direction in accordance with a plurality of ISO (International Organization for Standardization) sensitivity settings;
   a setting unit configured to set ISO (International Organization for Standardization) sensitivity;
   a calculating unit configured to generate two-dimensional correction data by expanding the one-dimensional correction data in a vertical direction, which is stored in the storage unit;
   a correction unit configured to correct image data outputted from the plurality of pixels by using the two-dimensional correction data generated by the calculating unit; and
   a control unit configured to read the one-dimensional correction data in the horizontal direction from the storage unit in accordance with the ISO (International Organization for Standardization) sensitivity set by the setting unit, and control the calculating unit so as to generate the two-dimensional correction data by expanding the read one-dimensional correction data in the vertical direction.

2. A control method for an image sensing apparatus which comprises a plurality of pixels arrayed in a horizontal and a vertical direction, a storage unit configured to store a plurality of one-dimensional correction data in a horizontal direction in accordance with a plurality of ISO (International Organization for Standardization) sensitivity settings, and a setting unit configured to set ISO (International Organization for Standardization) sensitivity, the method comprising:
   reading the one-dimensional correction data in the horizontal direction from the storage unit in accordance with the ISO (International Organization for Standardization) sensitivity set by the setting unit;
   generating two-dimensional correction data by expanding the read one-dimensional correction data in a vertical direction;
   correcting image data outputted from the plurality of pixels by using the generated two-dimensional correction data.

* * * * *